United States Patent
Nagatomi et al.

(10) Patent No.: US 11,377,033 B2
(45) Date of Patent: Jul. 5, 2022

(54) DISPLAY SYSTEM

(71) Applicant: Panasonic Intellectual Property Management Co., Ltd., Osaka (JP)

(72) Inventors: Kenji Nagatomi, Osaka (JP); Norihiro Imamura, Osaka (JP); Michihiro Yamagata, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 17/174,815

(22) Filed: Feb. 12, 2021

(65) Prior Publication Data
US 2021/0261058 A1     Aug. 26, 2021

(30) Foreign Application Priority Data

Feb. 21, 2020  (JP) .............................. JP2020-028682
Sep. 14, 2020  (JP) .............................. JP2020-153546

(51) Int. Cl.
*B60R 1/12*     (2006.01)
*B60R 1/08*     (2006.01)
*G02B 5/10*     (2006.01)

(52) U.S. Cl.
CPC .................. *B60R 1/12* (2013.01); *B60R 1/08* (2013.01); *B60R 2001/1215* (2013.01); *B60R 2300/205* (2013.01); *G02B 5/10* (2013.01)

(58) Field of Classification Search
CPC ..... B60R 1/12; B60R 1/08; B60R 2001/1215; B60R 2300/205; B60R 1/04; B60R 1/086;
(Continued)

(56) References Cited

U.S. PATENT DOCUMENTS

| 10,017,114 B2 | 7/2018 | Bongwald |
| 2013/0010366 A1 | 1/2013 | Nakamura et al. |
| 2020/0285044 A1* | 9/2020 | Noguchi ................ G08G 1/146 |

FOREIGN PATENT DOCUMENTS

| JP | 2011-197292 A | 10/2011 |
| JP | 2017-210229 | 11/2017 |

(Continued)

OTHER PUBLICATIONS

Office Action dated Nov. 30, 2021 issued in Japanese patent application No. 2020-153546 along with corresponding English translation.

*Primary Examiner* — James M Pontius
(74) *Attorney, Agent, or Firm* — Greenblum & Bernstein, P.L.C.

(57) ABSTRACT

A display system includes: a display device in a mobile body; a concave mirror for displaying, in a first mode, a virtual image of a display image shown by image light emitted by the display device; and a plane mirror for reflecting, in a second mode, a rear-view image shown by light that has entered the mobile body. In a top view of the mobile body, the display device and the concave mirror are disposed such that a straight line connecting centers of the display device and the concave mirror has a predetermined angle relative to a front-and-rear direction of the mobile body. A normal direction at a center of a concave mirror surface of the concave mirror when the first mode is functioning and a normal direction normal to a plane mirror surface of the plane mirror when the second mode is functioning are not parallel.

14 Claims, 24 Drawing Sheets

(58) Field of Classification Search
CPC .... B60R 2001/1253; G02B 5/10; G02B 5/09; G02B 26/0816
See application file for complete search history.

(56) References Cited

FOREIGN PATENT DOCUMENTS

| | | |
|---|---|---|
| JP | 2018-055075 | 4/2018 |
| JP | 2019-077327 A | 5/2019 |

* cited by examiner

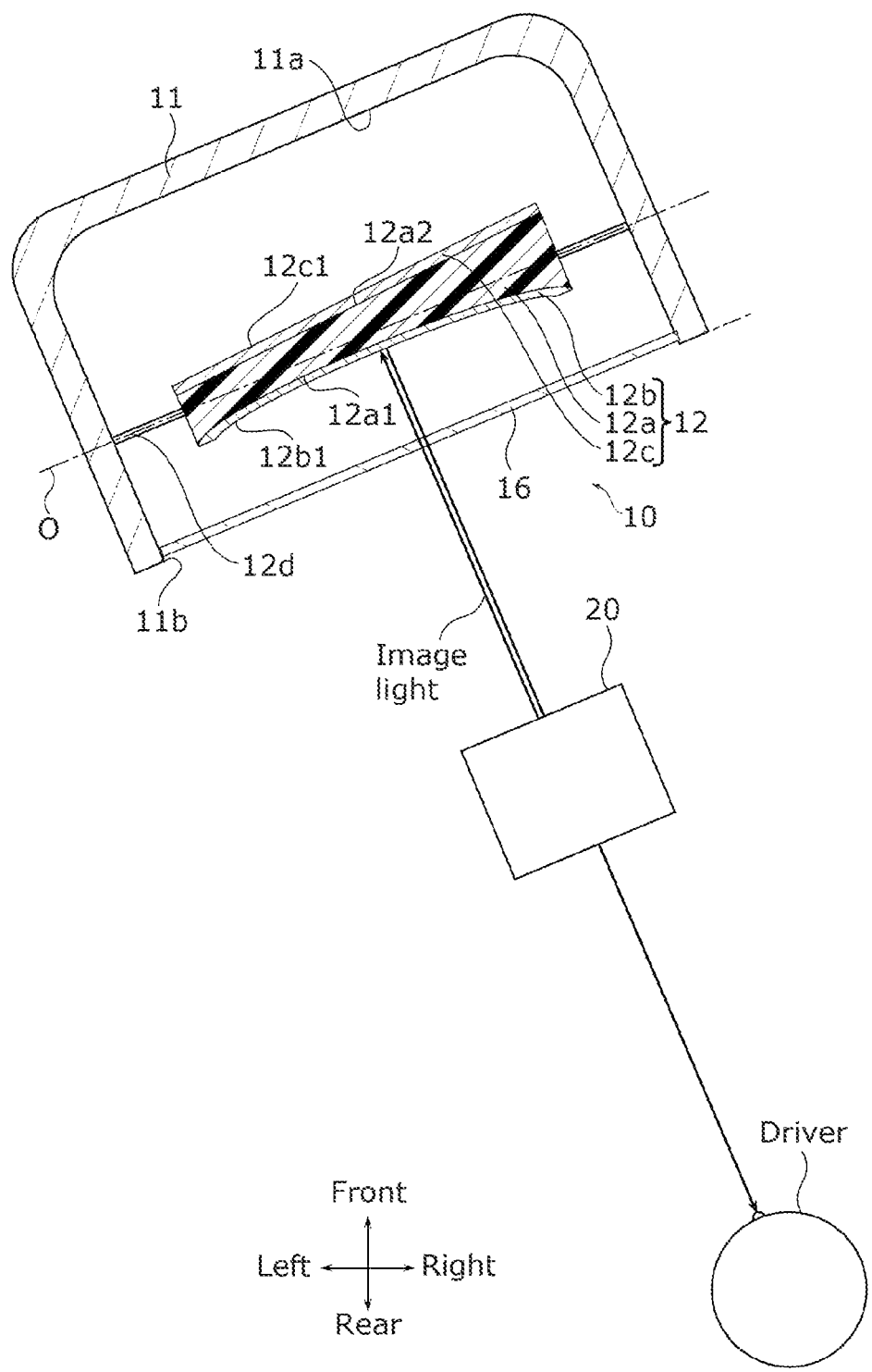

DISPLAY SYSTEM

CROSS REFERENCE TO RELATED APPLICATIONS

The present application is based on and claims priority of Japanese Patent Application No. 2020-028682 filed on Feb. 21, 2020 and Japanese Patent Application No. 2020-153546 filed on Sep. 14, 2020.

FIELD

The present disclosure relates to a display system for displaying images.

BACKGROUND

The vehicle visual system (the display system) disclosed in Patent Literature (PTL) 1 includes a projector, a screen, and a rear camera. The projector is disposed inside a vehicle. The screen is disposed near the windshield of the vehicle. The projector projects a rear image captured by the rear camera onto the screen.

CITATION LIST

Patent Literature

PTL 1: U.S. Pat. No. 10,017,114

SUMMARY

The display system according to PTL 1 is susceptible of a further improvement.

In view of this, a display system according to the present disclosure can exhibit an improvement over the above related art.

A display system according to an aspect of the present disclosure includes: a display provided in a mobile body; a concave mirror for displaying, in a first mode, a virtual image of a display image shown by image light emitted by the display; and a plane mirror for reflecting, in a second mode, a rear-view image shown by light that has entered the mobile body. In a top view of the mobile body, the display and the concave mirror are disposed such that a straight line that connects a center of the display and a center of the concave mirror has a predetermined angle relative to a front-and-rear direction of the mobile body, and a normal direction at a center of a concave mirror surface of the concave mirror when the first mode is functioning and a normal direction that is normal to a plane mirror surface of the plane mirror when the second mode is functioning are not parallel to each other.

Note that some specific aspects of the above may be implemented using a system, a method, an integrated circuit, a computer program, a computer-readable recording medium such as a CD-ROM, or any combination of systems, methods, integrated circuits, computer programs, or recording media.

The display system according to the present disclosure can exhibit an improvement over the above related art.

BRIEF DESCRIPTION OF DRAWINGS

These and other advantages and features of the present disclosure will become apparent from the following description thereof taken in conjunction with the accompanying drawings that illustrate a specific embodiment of the present disclosure.

FIG. 6A illustrates the display system according to Embodiment 1, and is a cross-sectional view illustrating an example of a state in which the optical body is placed in the first state as the first mode, and image light falls onto the optical body and is reflected, when the rear-view mirror is viewed from above.

DESCRIPTION OF EMBODIMENTS

Figure 1A:
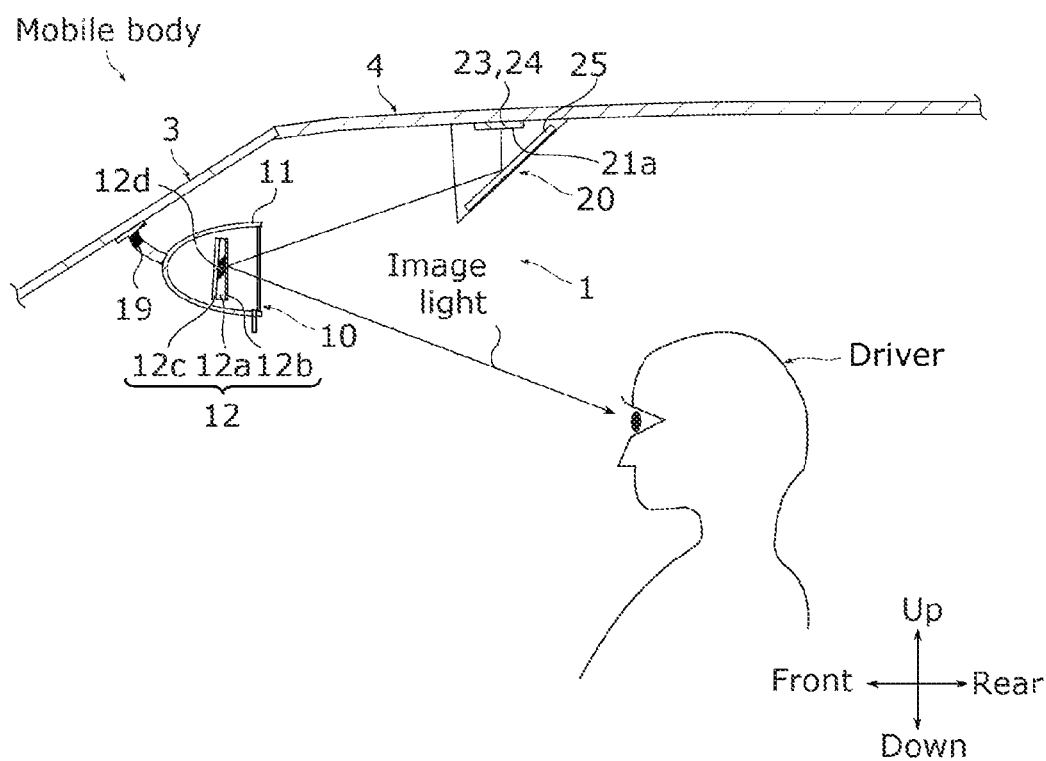
FIG. 1A illustrates a display system according to Embodiment 1, and is a schematic diagram illustrating an example of a state in which image light enters a rear-view mirror and is reflected.

In a conventional vehicle visual system (a display system), due to, for instance, a positional relationship between a projector and an optical system that includes a screen, light from the outside such as light from headlights of a vehicle behind may reflects off the screen and may enter the eyes of a driver (a person in a mobile body). Furthermore, with the conventional screen, the mirror surface cannot be changed as a measure to deal with malfunction of the vehicle visual system.

In view of this, a display system according to an aspect of the present disclosure includes: a display provided in a mobile body; a concave mirror for displaying, in a first mode, a virtual image of a display image shown by image light emitted by the display; and a plane mirror for reflecting, in a second mode, a rear-view image shown by light that has entered the mobile body. In a top view of the mobile body, the display and the concave mirror are disposed such that a straight line that connects a center of the display and a center of the concave mirror has a predetermined angle relative to a front-and-rear direction of the mobile body, and a normal direction at a center of a concave mirror surface of the concave mirror when the first mode is functioning and a normal direction that is normal to a plane mirror surface of the plane mirror when the second mode is functioning are not parallel to each other.

According to this, the orientation of the concave mirror is tilted for a predetermined angle relative to the front-and-rear direction of the mobile body in order to avoid the straight line that connects the display and the concave mirror matching the front-and-rear direction of the mobile body. Accordingly, even if light from the outside such as light from the headlights of a vehicle behind falls onto the concave mirror, reflection of the light toward the driver's eyes can be reduced, and thus a possibility that light from the outside reflects off the concave mirror and enters the driver's sight can be lowered.

Furthermore, the normal direction at the center of the concave mirror surface in the first mode and the normal direction that is normal to the plane mirror surface in the second mode are not parallel to each other. Consequently, the concave mirror and the plane mirror can be disposed such that, for example, the reflection direction in which image light falls on and reflects off the concave mirror surface and the reflection direction in which light falls on and reflects off the plane mirror surface are directed to the driver. Thus, when the first mode and the second mode are switched, the amount of adjusting the positions of the concave mirror and the plane mirror in the horizontal direction can be reduced.

Accordingly, light from the outside can be prevented from being reflected toward the driver, and the concave mirror and the plane mirror can be readily switched. In particular, in the display system, the display modes according to image light and light from the outside can be readily adjusted.

In the display system according to another aspect of the present disclosure, in the top view of the mobile body, the predetermined angle ranges from a lower limit angle to an upper limit angle, the lower limit angle being (i) obtained based on a distance between eyes of a person (a driver) in the mobile body who sees the concave mirror, and a length of a straight line that connects a middle point between the eyes and the center of the concave mirror, and (ii) formed between the straight line and a straight line that connects one of the eyes and the center of the concave mirror, the upper limit angle being formed between a straight line extending in a lateral direction relative to a direction in which the mobile body moves and passing through the center of the concave mirror and a straight line extending in the front-and-rear direction of the mobile body and passing through the center of the concave mirror.

According to this, in the range of the predetermined angle, the straight line that connects the display and the concave mirror is tilted relative to the front-and-rear direction of the mobile body, so that light from the outside reflects in a direction other than the direction toward the driver's eyes. Thus, a possibility that light from the outside reflects off the concave mirror and enters the driver's sight can be further lowered.

In the display system according to another aspect of the present disclosure, a line passing through the center of the display and extending along the display and a tangent at the center of the concave mirror are parallel to each other.

According to this, even if the display is disposed in an orientation in which the straight line that connects the display and the concave mirror is tilted relative to the front-and-rear direction of the mobile body, the lengths of optical paths between the display and the concave mirror are substantially the same, and thus distortion of an image appearing in the concave mirror, which the driver can see, can be reduced.

In the display system according to an aspect of the present disclosure, the display is disposed closer to a driver of the mobile body than to a straight line that is parallel to the front-and-rear direction of the mobile body and passes through the center of the concave mirror.

According to this, an angle between a straight line that connects the display and the concave mirror and a straight line that connects the driver and the concave mirror is decreased, and thus an overall difference of the lengths of light paths is decreased so that image distortion can be decreased.

In the display system according to another aspect of the present disclosure, the concave mirror and the plane mirror are stored in a first casing, and the first casing includes a rotation shaft for rotating the concave mirror and the plane mirror inside of the first casing.

According to this, the concave mirror and the plane mirror can be rotated by rotating the rotation shaft. Accordingly, the first mode and the second mode can be readily switched by merely rotating the rotation shaft. If the concave mirror and the plane mirror are disposed such that the reflection direction in which image light falls on and reflects off the concave mirror surface and the reflection direction in which light falls on and reflects off the plane mirror surface are directed to the driver, image light reflecting off the concave mirror surface and light reflecting off the plane mirror surface can be caused to travel toward the driver by rotating the rotation shaft for the same amount when switching to either of the modes.

The display system according to another aspect of the present disclosure further includes: an optical body that includes the concave mirror and the plane mirror. The plane mirror is opposed to the concave mirror such that the plane mirror surface faces outward, and the optical body has a wedge shape when the optical body is viewed in an up-and-down direction of the mobile body.

According to this, the plane mirror and the concave mirror can be disposed on the opposite sides of the optical body, and furthermore the orientation of the concave mirror can be tilted relative to the orientation of the plane mirror, in the front-and-rear direction of the mobile body and along the horizontal plane. Accordingly, when the first mode and the second mode are switched, the amount of adjusting the position of the display system in the horizontal direction can be decreased.

In the display system according to another aspect of the present disclosure, a distance between the plane mirror and the concave mirror at an end portion of the optical body closer to a driver of the mobile body in a lateral direction is shorter than a distance between the plane mirror and the concave mirror at an end portion of the optical body farther from the driver in the lateral direction, the lateral direction being a direction relative to a direction in which the mobile body moves.

According to this, when the optical body is disposed obliquely forward relative to the driver, if the thickness of the optical body at an end portion closer to the driver is made less than the thickness of the optical body at the other end portion, the length of the first casing on the side closer to the driver can be made shorter than the length of the first casing on the side farther from the driver. Accordingly, the region in the console of the mobile body in which the display system is disposed can be effectively utilized.

In the display system according to another aspect of the present disclosure, the plane mirror faces in a direction opposite to a direction in which the concave mirror faces, and the concave mirror and the plane mirror are disposed such that: the normal direction at the center of the concave mirror surface and the normal direction that is normal to the plane mirror surface are parallel to each other; and the plane mirror surface of the plane mirror and an axis direction of the rotation shaft are not parallel to each other.

According to this, the normal direction at the center of the concave mirror surface and the normal direction that is normal to the plane mirror surface are parallel, the optical body can be readily manufactured, and thus the cost for manufacturing the optical body is less likely to make a sharp rise. The normal direction at the center of the concave mirror surface when the first mode is functioning and the normal direction that is normal to the plane mirror surface when the second mode is functioning can be readily prevented from being parallel to each other, by merely avoiding the plane mirror surface of the plane mirror and the axial direction of the rotation shaft being parallel to each other. Accordingly, the amount of adjusting the position of the display system in the horizontal direction can be decreased.

The display system according to another aspect of the present disclosure further includes: an optical body that includes the concave mirror and the plane mirror. The plane mirror faces in a direction opposite to a direction in which the concave mirror faces, and the optical body has a wedge shape when the optical body is viewed in a lateral direction relative to a direction in which the mobile body moves.

According to this, the plane mirror and the concave mirror can be disposed on the opposite sides of the optical body, and furthermore the orientation of the concave mirror can be tilted relative to the orientation of the plane mirror, in the front-and-rear direction of the mobile body and along the plane vertical to the plane mirror surface. Accordingly, when the first mode and the second mode are switched, the amount of adjusting the position of the display system in the horizontal direction can be decreased.

In the display system according to another aspect of the present disclosure, the plane mirror and the concave mirror are stored in a second casing, and the plane mirror is disposed between the concave mirror and a driver of the mobile body when the display system is viewed in an up-and-down direction of the mobile body.

According to this, the plane mirror can be disposed closer to the driver, and the concave mirror can be disposed farther from the driver than the plane mirror. Accordingly, light can fall onto the entire plane mirror surface of the plane mirror, and thus a shadow of the second casing is less likely to be made on the plane mirror surface.

In the display system according to another aspect of the present disclosure, the plane mirror is fixed to the second casing, and changes light transmittance.

According to this, the light transmittance of the plane mirror can be changed, and thus, for example, even if dazzling light from headlights of a mobile body behind, for instance, enters at night, the glare that the driver feels can be reduced.

In the display system according to another aspect of the present disclosure, the normal direction that is normal to the plane mirror surface in the second mode tilts 10 degrees or more relative to an optical axis direction of light reflected by the concave mirror in the first mode.

According to this, the normal direction that is normal to the plane mirror surface can be tilted for 10 degrees or more relative to the optical axis direction of light reflected by the concave mirror surface. Accordingly, an object (a rear-view image) present behind the mobile body can be prevented from appearing in the display system.

In the display system according to another aspect of the present disclosure, the plane mirror is movable, and is stored in the second casing in the first mode.

According to this, the plane mirror can be moved, and thus the second mode and the first mode can be readily switched.

In the display system according to another aspect of the present disclosure, the plane mirror includes a Fresnel reflection surface.

According to this, the plane mirror can control distribution of incident light from behind the mobile body and reflect the light. Accordingly, an increase in the size of the display system can be reduced as compared with a configuration in which a line passing through the center of the plane mirror surface that is a single plane and extending in a defined direction along the plane mirror surface and a tangent at the center of the concave mirror surface, which is extending in a defined direction of the concave mirror surface are not parallel.

In the display system according to another aspect of the present disclosure, the plane mirror includes an orientation adjuster that adjusts an orientation relative to the concave mirror surface.

According to this, the orientation of the plane mirror relative to the concave mirror can be adjusted discretionarily, and thus the flexibility of adjustment of the display system can be increased when the second mode and the first mode are switched.

The embodiments described below each show a specific example of the present disclosure. The numerical values, shapes, materials, elements, and the locations of the elements, for instance, described in the following embodiments are examples, and thus are not intended to limit the present disclosure. Among the elements in the following embodiments, elements not recited in the independent claim are described as arbitrary elements. Further, features in all the embodiments can be combined.

The drawings are schematic diagrams, and do not necessarily provide strictly accurate illustration. Further, the same numeral is given to the same element throughout the drawings. In the following embodiments, expression such as "substantially parallel" is used. For example, "substantially parallel" means not only completely parallel, but also approximately parallel. Thus, "substantially parallel" also means approximately several percent of error, for example, being included. Specifically, "parallel" means that an angle (an acute angle) formed between two target straight lines ranges from 0 degrees to 10 degrees. Note that "parallel" more preferably means that an angle (an acute angle) formed between two target straight lines ranges from 0 degrees to 5 degrees. Further, "substantially parallel" means being parallel in a range in which advantageous effects of the present disclosure can be yielded. The same applies to other expressions that include "substantially".

The following specifically describes a display system according to the present disclosure, with reference to the drawings.

Embodiment 1

<Configuration: Display System 1>

Figure 1B:
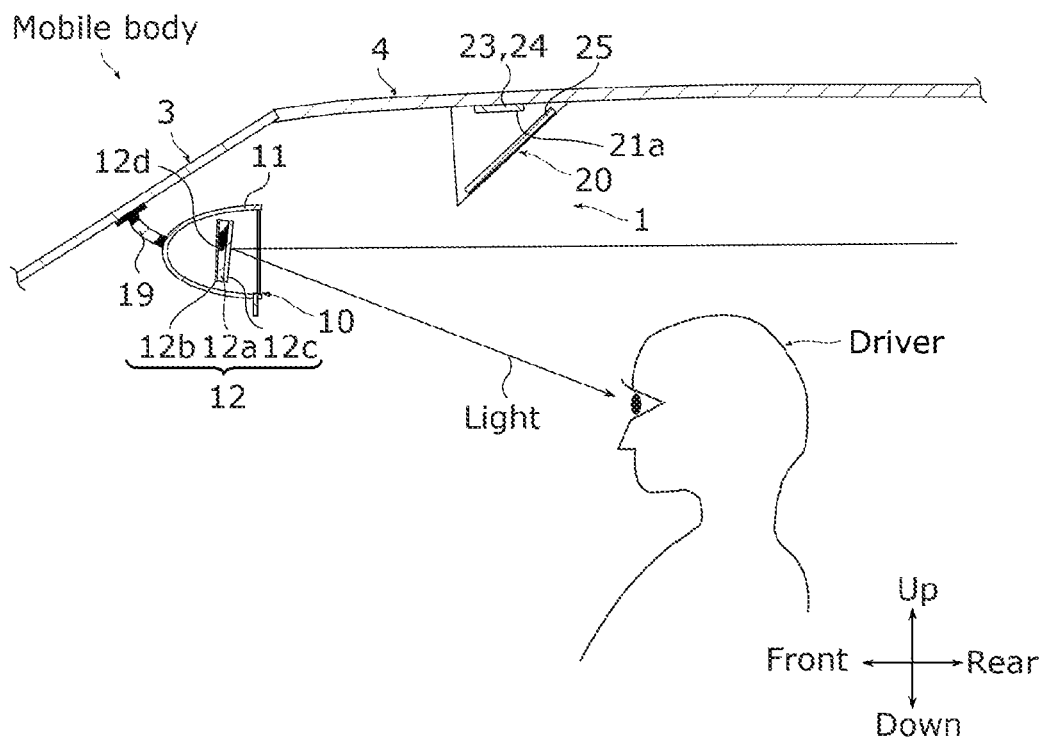
FIG. 1B illustrates the display system according to Embodiment 1, and is a schematic diagram illustrating an example of a state in which light from behind a mobile body enters the rear-view mirror and is reflected.

FIG. 1A illustrates display system 1 according to Embodiment 1, and is a schematic diagram illustrating an example of a state in which image light enters rear-view mirror 10 and is reflected. FIG. 1B illustrates display system 1 according to Embodiment 1, and is a schematic diagram illustrating an example of a state in which light from behind a mobile body enters rear-view mirror 10 and is reflected.

As illustrated in FIGS. 1A and 1B, display system 1 is provided in the mobile body, and is disposed on ceiling 4 of the main part of the mobile body or a portion of windshield 3 near ceiling 4, for example. Display system 1 is driven using electric power obtained from the mobile body. Examples of the mobile body include a vehicle such as a car, a watercraft, and an aircraft. The present embodiment gives description using a car as a mobile body.

Display system 1 is configured to allow a driver to see an object present behind or around the mobile body. Display system 1 displays a display image as an image of an object present behind the mobile body, which is captured by imaging unit 31 (described later) provided in the mobile body. Display system 1 displays a rear-view image of an object present behind the mobile body using incident light from behind the mobile body. Thus, display system 1 functions also as a rear-view mirror.

Display system 1 has a plurality of operation modes. Out of the operation modes, a first mode is for displaying, when image light emitted through display surface 21a of display device 20 is projected on optical body 12 described below, a virtual image of a display image shown by the projected image light. Out of the operation modes, a second mode is for displaying a rear-view image of an object behind the mobile body by reflecting incident light from behind the mobile body.

Figure 2:
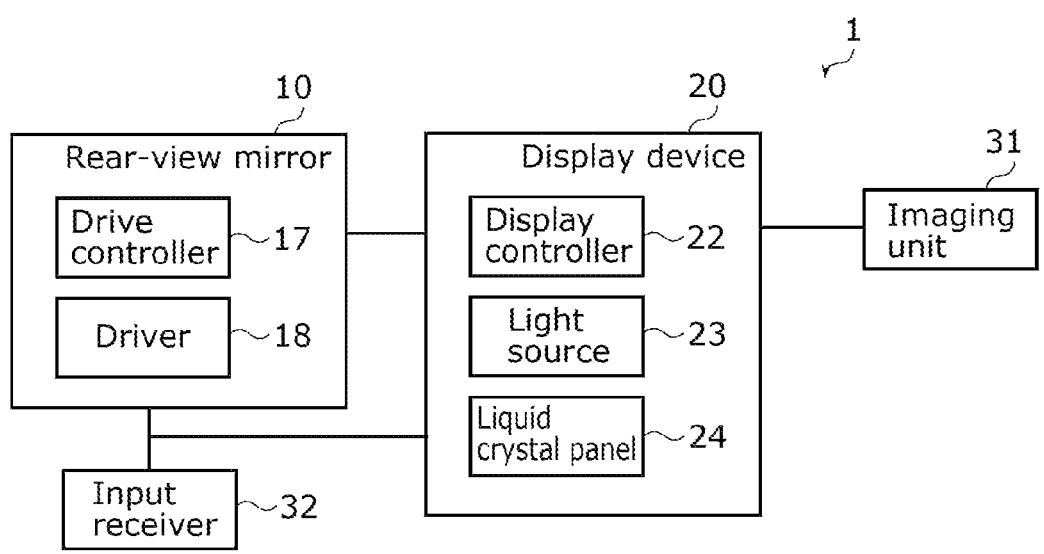
FIG. 2 is a block diagram illustrating an example of the display system according to Embodiment 1.

FIG. 2 is a block diagram illustrating an example of display system 1 according to Embodiment 1.

As illustrated in FIGS. 1A, 1B, and 2, display system 1 includes imaging unit 31, display device 20, rear-view mirror 10, and input receiver 32.

[Imaging Unit 31]

Imaging unit 31 is provided in the mobile body to capture images of the surrounding of the mobile body, especially a view behind the mobile body. Imaging unit 31 outputs image data of an image captured behind the mobile body to display device 20. Imaging unit 31 is a complementary metal oxide semiconductor (CMOS) image sensor, and captures images behind the mobile body, for example. Imaging unit 31 is not limited to a CMOS image sensor, and may be an image sensor such as a charge coupled device (CCD) image sensor.

[Display Device 20]

Display device 20 is disposed on ceiling 4 of the main part of the mobile body in an orientation that allows display device 20 to convey an image captured by imaging unit 31 to rear-view mirror 10, with display surface 21a facing downward. When the mobile body is viewed in the up-and-down direction, display device 20 is disposed closer to a driver than at least optical body 12, in the front-and-rear direction of the mobile body. Display device 20 is provided in an overhead console, for example. Display device 20 emits image light that forms an image. Display device 20 is an example of a display.

Display device 20 includes display controller 22, light source 23, and liquid crystal panel 24 (that is a liquid crystal display (LCD)).

Display controller 22 controls a display state of an image displayed by display device 20. Display controller 22 is communicably connected to imaging unit 31 via a network inside the mobile body, and obtains image data of a captured image from imaging unit 31. Display controller 22 causes liquid crystal panel 24 to display an image based on image data obtained from imaging unit 31, or in other words, causes display surface 21a of display device 20 to display the image.

When the second mode is carried out (when optical body 12 is in a second orientation described below), display controller 22 prevents light source 23 from emitting image light. Thus, according to switching between the first mode and the second mode, display controller 22 controls allowing and preventing emission of image light from light source 23.

Light source 23 is a light-emitting module used as a backlight of liquid crystal panel 24. Light source 23 is a side-lit light source in which a solid light emitting element such as a light emitting diode or a laser diode is used, and is disposed above liquid crystal panel 24. Light emitted by light source 23 passes through liquid crystal panel 24, and is emitted through display surface 21a of display device 20, so as to be image light emitted through display surface 21a of display device 20.

Liquid crystal panel 24 is a liquid crystal display element disposed below light source 23. For example, liquid crystal panel 24 is a light transmissive or semi-transmissive thin film transistor (TFT) liquid crystal display, for instance. In liquid crystal panel 24, light is emitted from light source 23 disposed on a side of liquid crystal panel 24 not facing optical member 25, and passes through liquid crystal panel 24, so that light is emitted through display surface 21a facing optical member 25. Image light that shows an image that includes a number, a text, or a graphic, for instance, is emitted through liquid crystal panel 24 according to a control instruction from display controller 22.

Display device 20 displays an image captured by imaging unit 31 on display surface 21a, and emits image light that shows an image through display surface 21a. Image light emitted through display surface 21a reflects off optical member 25, and thereafter enters rear-view mirror 10. Consequently, the image light reflects off rear-view mirror 10, and enters the driver's eye(s). Accordingly, the driver can see a display image shown by image light emitted to rear-view mirror 10, based on an image displayed on display surface 21a of display device 20.

[Rear-View Mirror 10]

Rear-view mirror 10 is a mirror for displaying the rear view of the mobile body, for example, and is disposed on a portion of windshield 3 near ceiling 4, in a position within the sight of the driver sitting in a front seat. Rear-view mirror 10 is attached to windshield 3 of the mobile body via attaching bracket 19. Rear-view mirror 10 includes a hinge between first casing 11 and attaching bracket 19 in order that the driver can adjust rear-view mirror 10 to a preferable position at a preferable angle. Note that rear-view mirror 10 may be disposed on an overhead console for instance, and is not limited to be attached to windshield 3.

Optical body 12 is provided inside of rear-view mirror 10. Optical body 12 includes support 12a, concave mirror 12b, plane mirror 12c, and rotation shaft 12d, which will be described in detail below. Concave mirror 12b and plane mirror 12c are supported by support 12a. Rear-view mirror 10 has a configuration in which support 12a rotates around rotation shaft 12d, so that concave mirror 12b and plane mirror 12c are switched, thus causing concave mirror 12b to face the driver as illustrated in FIG. 1A and plane mirror 12c to face the driver as illustrated in FIG. 1B.

Figure 3A:
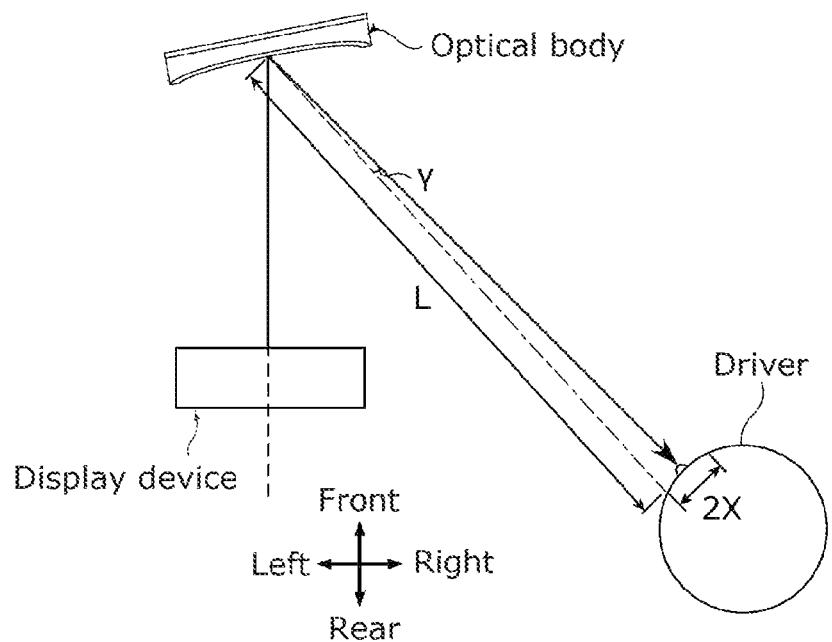
FIG. 3A is a schematic diagram illustrating a position of the display device relative to an optical body and a driver, in a conventional display system.
Figure 3B:
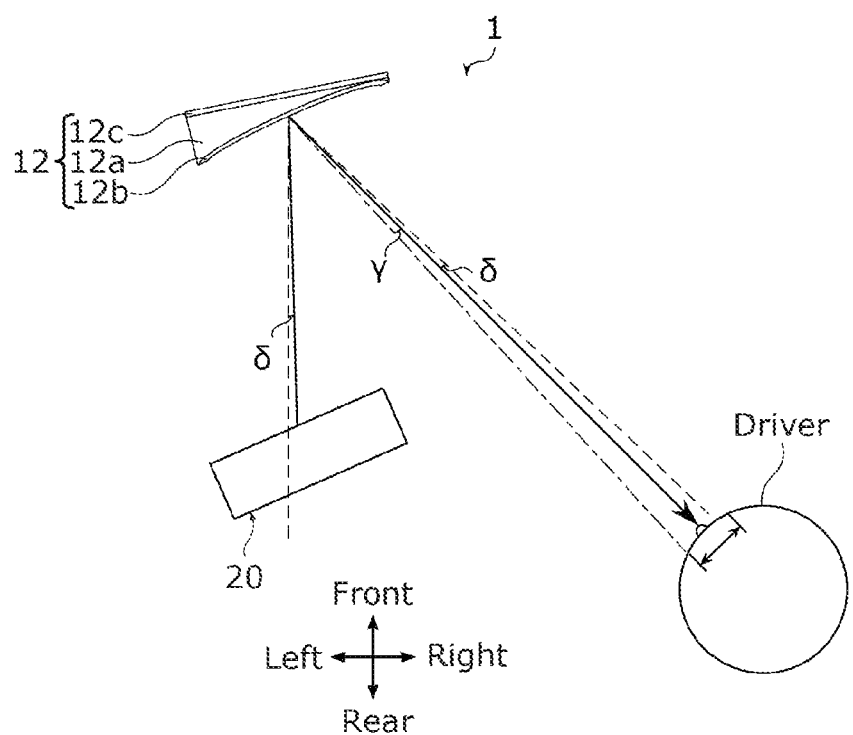
FIG. 3B is a schematic diagram illustrating a position of the display device relative to an optical body and a driver when the display device is shifted rightward in a top view of the mobile body provided with the display system according to Embodiment 1.
Figure 3C:
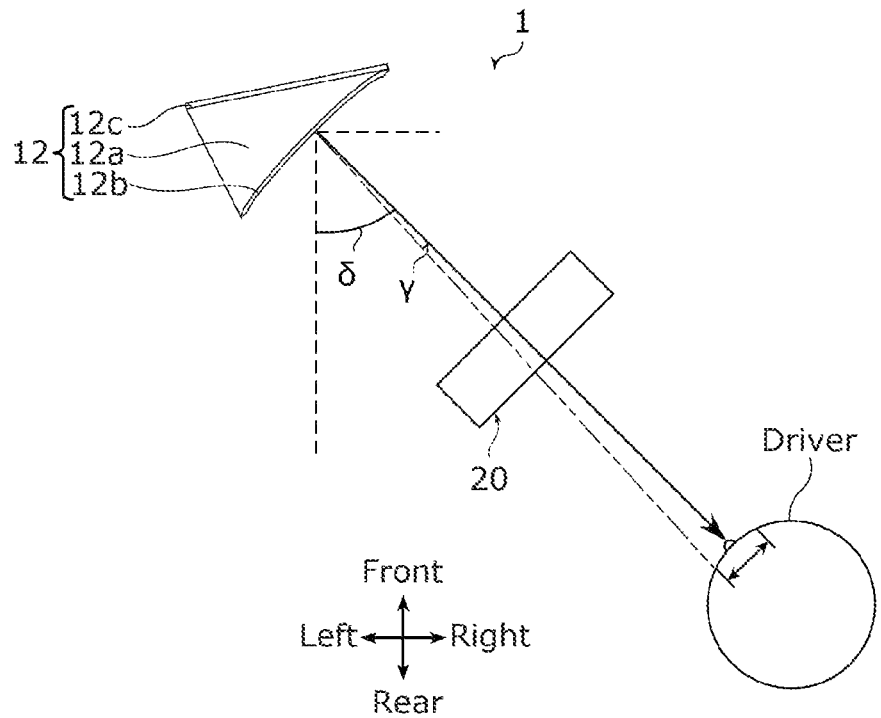
FIG. 3C is another schematic diagram illustrating a position of the display device relative to the optical body and a driver when the display device is shifted rightward in a top view of the mobile body provided with the display system according to Embodiment 1.
Figure 3D:
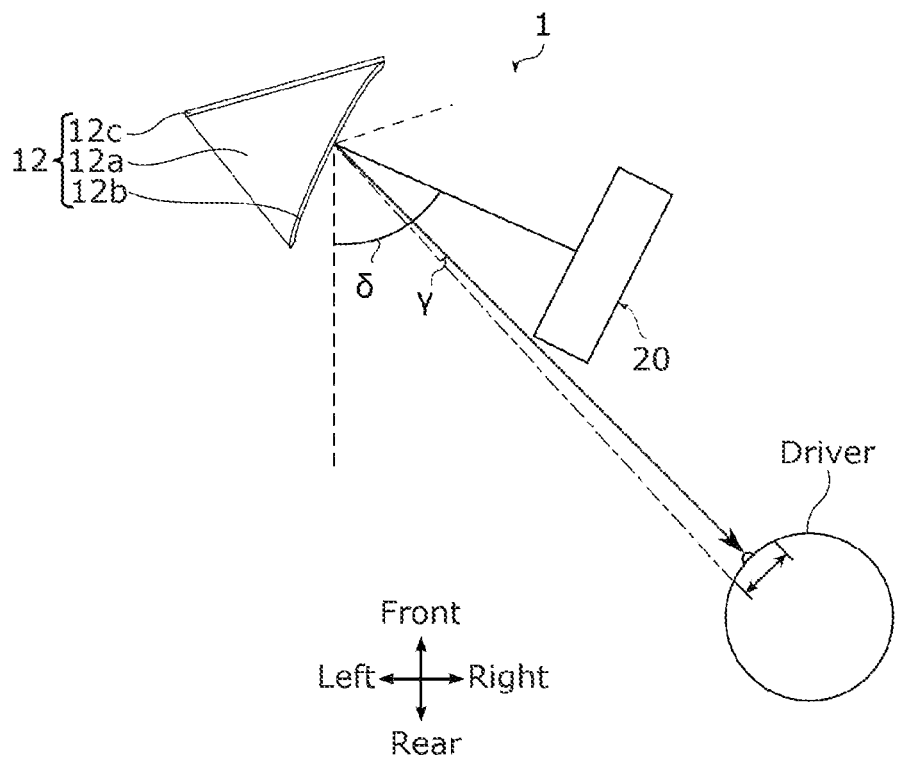
FIG. 3D is still another schematic diagram illustrating a position of the display device relative to the optical body and a driver when the display device is shifted rightward in a top view of the mobile body provided with the display system according to Embodiment 1.
Figure 4A:
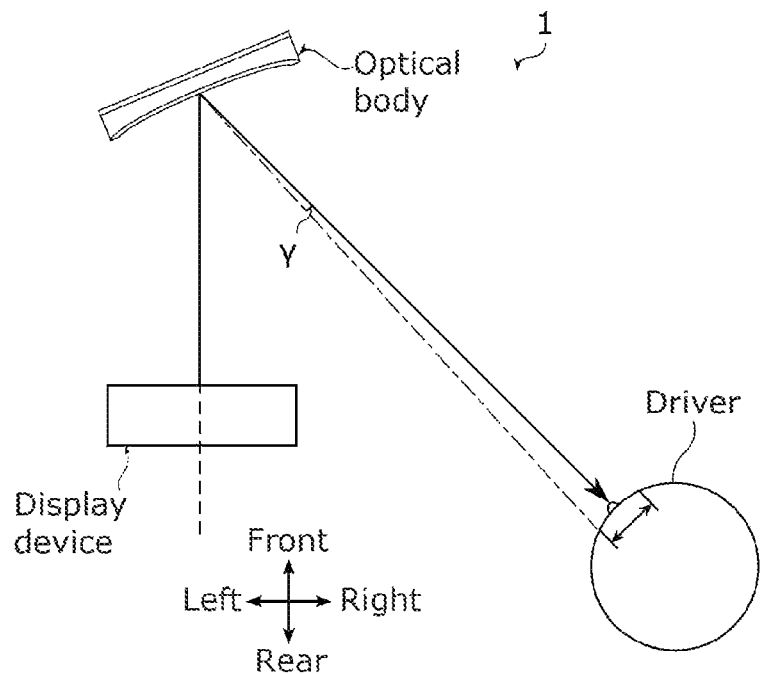
FIG. 4A is a schematic diagram illustrating a position of the display device relative to the optical body and a driver, in the conventional display system.
Figure 4B:
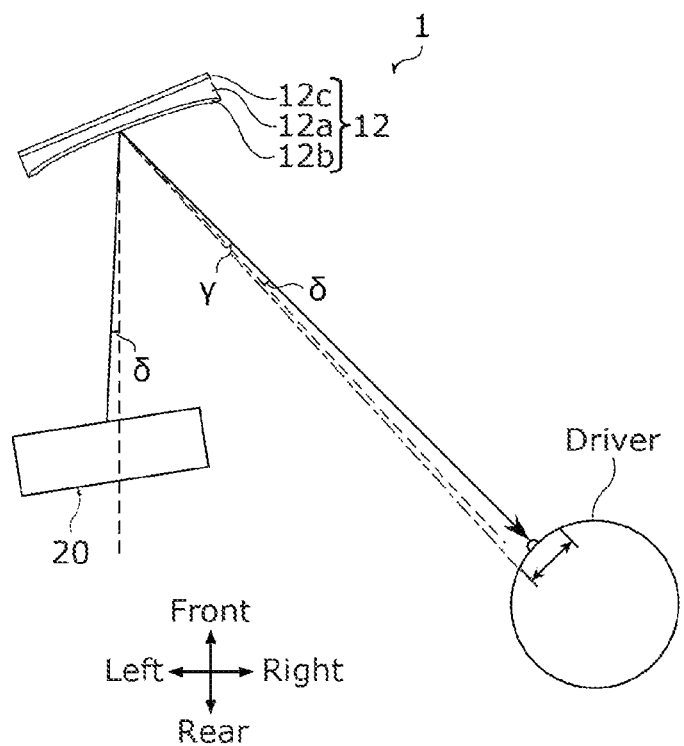
FIG. 4B is a schematic diagram illustrating a position of the display device relative to the optical body and a driver when the display device is shifted leftward in a top view of the mobile body provided with the display system according to Embodiment 1.
Figure 4C:
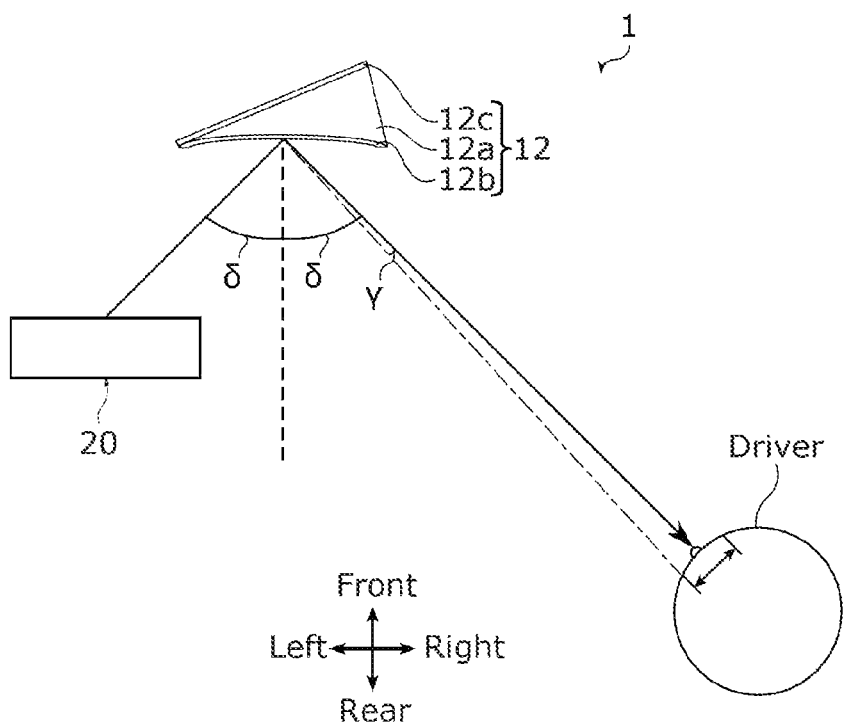
FIG. 4C is another schematic diagram illustrating a position of the display device relative to the optical body and a driver when the display device is shifted leftward in a top view of the mobile body provided with the display system according to Embodiment 1.
Figure 4D:
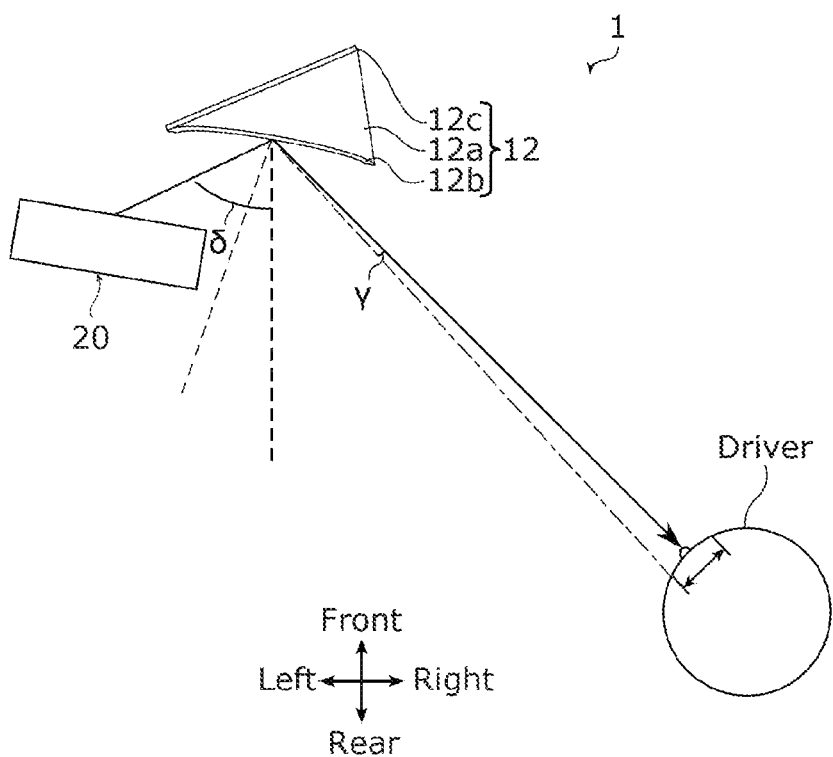
FIG. 4D is still another schematic diagram illustrating a position of the display device relative to the optical body and a driver when the display device is shifted leftward in a top view of the mobile body provided with the display system according to Embodiment 1.

The following describes positional relationships of the display device relative to optical body 12 and a driver, with reference to FIGS. 3A to 3D and 4A to 4D. FIG. 3A is a schematic diagram illustrating a position of the display device relative to an optical body and a driver, in a conventional display system. FIG. 3B is a schematic diagram illustrating the position of display device 20 relative to optical body 12 and a driver when display device 20 is shifted rightward in a top view of the mobile body provided with display system 1 according to Embodiment 1. FIG. 3C is another schematic diagram illustrating the position of display device 20 relative to optical body 12 and a driver when display device 20 is shifted rightward in a top view of the mobile body provided with display system 1 according to Embodiment 1. FIG. 3D is still another schematic diagram illustrating the position of display device 20 relative to optical body 12 and a driver when display device 20 is shifted rightward in a top view of the mobile body provided with display system 1 according to Embodiment 1. FIG. 4A is a schematic diagram illustrating the position of the display device relative to the optical body and a driver, in the conventional display system. FIG. 4B is a schematic diagram illustrating the position of display device 20 relative to optical body 12 and a driver when display device 20 is shifted leftward in a top view of the mobile body provided with display system 1 according to Embodiment 1. FIG. 4C is another schematic diagram illustrating the position of display device 20 relative to optical body 12 and a driver when display device 20 is shifted leftward in a top view of the mobile body provided with display system 1 according to Embodiment 1. FIG. 4D is still another schematic diagram illustrating the position of display device 20 relative to optical body 12 and a driver when display device 20 is shifted leftward in a top view of the mobile body provided with display system 1 according to Embodiment 1.

First, the case where display device 20 is shifted rightward, that is, toward the driver in a top view of the mobile body, as compared with the conventional display device in FIG. 3A is to be described with reference to FIGS. 3A to 3D. FIGS. 3A to 3D illustrate examples of cases in top views of the mobile body. In the drawings, the solid lines each indicate an optical path from display device 20 to the driver, whereas the dashed lines each indicate an optical path of light that enters from the outside through the rear window of the mobile body such as light from headlights of a vehicle behind. In addition, the dashed dotted lines in the drawings are each a fixed straight line that connects the center of concave mirror 12b to the left eye of the driver.

First, FIG. 3A illustrates the position of the display device relative to the optical body and the driver, in the conventional display system. Here, the angles illustrated in FIG. 3A are to be defined. The definitions apply not only to FIG. 3A, but also to the other drawings (FIGS. 3B to 3D and 4A to 4D). In FIG. 3A, an angle (an acute angle) formed between a straight line that connects the center of the driver's face and the center of the concave mirror and a straight line that connects the driver's left eye and the center of the concave mirror is defined as angle γ. Further, an angle (an acute angle) formed between a straight line that connects the center of display device 20 and the center of concave mirror 12b and a straight line parallel to the front-and-rear direction of the vehicle is defined as angle δ. In FIG. 3A, angle γ can be obtained by γ=arctan (X/L), where L denotes the length of a straight line that connects the midpoint of the right and left eyes of the driver (the midpoint between the eyes) and the center of the concave mirror, and X denotes half the distance between the right and left eyes of the driver (the distance between the eyes). Angle γ is constant not only in FIG. 3A but also in other drawings (FIGS. 3B to 3D and 4A to 4D). As a specific example, angle γ is approximately 4 degrees, assuming that an average distance between eyes of a person (indicated by 2X) is 65 mm and L is 500 mm. On the other hand, angle δ is 0 degrees in FIG. 3A. Note that angle γ may change depending on the values of 2X and L. For example, angle γ may be approximately 1.8 degrees.

Note that a tangent passing through the center of display device 20 and extending along display device 20 and a tangent at the center of concave mirror 12b are parallel to each other in FIGS. 3B to 3D and 4B to 4D illustrating configurations of the present embodiment described below. Note that a tangent passing through the center of display device 20 and extending along display device 20 means a tangent passing through the center of display surface 21a (described later) of display device 20 and extending along display surface 21a of display device 20, and a tangent at the center of concave mirror 12b means a tangent at concave mirror surface 12b1 (described later). Accordingly, in the present embodiment, even if display device 20 is disposed in such a manner that a straight line that connects display device 20 and concave mirror 12b tilts relative to the front-and-rear direction of the mobile body, a state is maintained in which the distance between display device 20 and concave mirror 12b is substantially constant irrespective of a spot, or in other words, the lengths of optical paths are substantially the same, and thus distortion of an image appearing in concave mirror 12b, which the driver can see, can be controlled.

With the configuration (a conventional configuration) in FIG. 3A, in a top view of the mobile body, an optical path (a solid line) along which light from the display device reflects off the concave mirror of the optical body and travels toward the driver matches an optical path (a dashed line) along which light from the outside which enters through the rear of the vehicle reflects off the concave mirror of the optical body and travels toward the driver. Accordingly, if light from the outside falls onto the concave mirror, the light may reach the driver, so that the light from the outside reflected by the concave mirror may enter the driver's eye(s).

Next, consider a configuration in which display device 20 is slightly shifted rightward (toward the driver), in a top view of the mobile body, as illustrated in FIG. 3B. Accordingly, the position of concave mirror 12b is also rotated counterclockwise so that the driver can see light from display device 20. An example of the case where the position of display device 20 is slightly shifted rightward, so that angle δ and angle γ satisfy the condition δ<γ at this time. For example, angle δ is 2 degrees. As indicated by the dashed line, outside light from behind the mobile body in this case reflects off concave mirror 12b, and thereafter may reach the right eye side of the driver at angle δ from the straight line that connects the center of the driver's face and the center of concave mirror 12b, as compared with FIG. 3A. However, the light from the outside reflected by concave mirror 12b reaches a position within width 2X which is the distance between the driver's eyes (the width or range indicated by the double-pointed arrow in FIG. 3B), and thus there still remains a possibility that the reflected light from the outside enters the driver's eye(s) just by the driver moving slightly.

Thus, if angle δ is further increased, the optical path of reflected light from the outside illustrated in FIG. 3B shifts (rotates) rightward and counterclockwise. Then, when δ=γ, light from the outside reaches exactly the driver's right eye. Accordingly, in the range of δ≤γ, the optical path of reflected light from the outside reaches a position between the driver's right and left eyes. Consequently, the reflected light from the outside may reach the driver's eye(s) just by the driver moving slightly. In other words, in the range of δ>γ, the optical path of reflected light from the outside is further away from a position between the driver's right and left eyes, and thus a possibility that light from the outside reaches the driver's eye(s) is lowered.

In view of this, consider a configuration in which display device 20 is further shifted rightward (toward the driver) in a top view of the mobile body, as illustrated in FIG. 3C. Specifically, the position of display device 20 is shifted so that angle δ and angle γ satisfy the condition δ>γ. In response to this, the position of concave mirror 12b is also rotated counterclockwise in order that the driver can see light from display device 20. Here, in order to satisfy δ>γ, an example in which angle δ is 45 degrees is shown. Light from the outside entering from behind the mobile body in this case is reflected by concave mirror 12b and thereafter travels rightward of the mobile body as indicated by the dashed line. Thus, there is almost no possibility that light from the outside reaches the driver's eye(s).

Note that the arrangement illustrated in FIG. 3C shows that concave mirror 12b and display device 20 are directly in front of the driver. Accordingly, when a horizontal distance from the center of the driver's seat to the center of the mobile body is 350 mm, L=500 mm as described above, and thus an angle (an acute angle) formed between a straight line that connects the driver and the center of concave mirror 12b and a straight line in the front-and-rear direction of the vehicle is arcsin (350/500)=approximately 45 degrees, and substantially matches angle δ. Thus, concave mirror 12b and display device 20 are directly in front of the driver.

In this configuration, the tangent passing through the center of display device 20 and extending along display device 20 and the tangent at the center of concave mirror 12b are parallel to each other. Accordingly, light (image light) emitted by display device 20 is reflected by concave mirror 12b substantially perpendicularly, and reaches the driver.

Accordingly, the length of the optical path of image light is substantially constant, irrespective of a spot. Accordingly, image distortion decreases most, as compared with the other configurations illustrated in FIGS. 3A, 3B, 3D and 4A to 4D.

Next, as illustrated in FIG. 3D, consider a configuration in which display device 20 is further shifted rightward (toward the driver) in a top view of the mobile body, as compared with FIG. 3C. Specifically, the position of display device 20 is shifted so that angle δ and angle γ satisfy δ>>γ. According to this, the position of concave mirror 12b is also further rotated counterclockwise in order that the driver can see light from display device 20. As a result, light from the outside entering from behind the mobile body reflects off concave mirror 12b, and travels toward the front side of the vehicle. Accordingly, there is almost no possibility that light from the outside enters the driver's eyes.

Note that as angles that satisfy δ>γ, if angle δ is further increased, when angle δ reaches 90 degrees, a straight line that connects the center of display device 20 and the center of concave mirror 12b is parallel to the lateral direction of the mobile body. Accordingly, when angle δ substantially exceeds 90 degrees, display device 20 will be disposed ahead of concave mirror 12b in the mobile body. However, as illustrated in FIG. 1A, rear-view mirror 10 that includes concave mirror 12b is disposed on windshield 3, and thus arrangement that makes angle δ substantially exceed 90 degrees is the arrangement in which display device 20 is disposed ahead of windshield 3, which is practically impossible.

The following is a summary of the above. The straight line that connects the center of display device 20 and the center of concave mirror 12b has predetermined angle δ relative to the front-and-rear direction of the mobile body, in a top view of the mobile body. In a top view of the mobile body, predetermined angle δ ranges from lower limit angle γ to an upper limit angle, lower limit angle γ being (i) obtained based on a distance (2X) between eyes of a person in the mobile body who sees concave mirror 12b, and a length (L) of a straight line that connects a middle point between the right and left eyes and the center of concave mirror 12b, and (ii) formed at the center of concave mirror 12b, the upper limit angle being formed between a straight line extending in a lateral direction relative to a direction in which the mobile body moves and passing through the center of concave mirror 12b and a straight line extending in the front-and-rear direction of the mobile body and passing through the center of concave mirror 12b. A specific example of predetermined angle δ is 4 degrees<δ<90 degrees.

Note that even if angle δ slightly exceeds 90 degrees due to, for instance, the orientations, the shapes, and the sizes of concave mirror 12b and display device 20, there may be a case in which display device 20 is not disposed ahead of windshield 3, and thus angle δ is not limited to an angle smaller than 90 degrees. Note that according to the example described in the present embodiment, display device 20 is disposed ahead of concave mirror 12b in the mobile body if angle δ is 90 degrees or more, and thus the case where angle δ is less than 90 degrees is described.

Note that when γ is approximately 1.8 degrees, predetermined angle δ may satisfy 1.8 degrees<δ<90 degrees as a specific example.

Note that γ that is the lower limit of angle δ is obtained based on a distance between eyes in Embodiment 1 described above, yet it is desirable that light from the outside reflected by concave mirror 12b reaches anywhere other than the eye box area. In this case, for example, if the width of the eye box is made twice the distance between eyes (=4X), angle γ is approximately 8 degrees.

Furthermore, regarding the upper limit angle, as described with reference to FIG. 3C, when angle δ is 45 degrees (=δ1), image distortion is the least, and if angle δ is greater than 45 degrees, image distortion increases. Accordingly, the upper limit angle is desirably angle δ1. Furthermore, the greater angle δ is, the size of support 12a that supports concave mirror 12b and plane mirror 12c also increases. From the above, a desirable range of predetermined angle δ is 8 degrees<δ≤δ1 (45 degrees).

Next, similarly, the cases are to be described in which display device 20 is shifted leftward, that is, in the direction farther away from the driver in a plan view of the mobile body, as compared with the conventional display device in FIG. 4A, with reference to FIGS. 4A to 4D. FIGS. 4A to 4D illustrate examples of top views of the mobile body. The meanings of the solid lines, the dashed lines, and the dashed dotted lines in the drawings are the same as those in FIGS. 3A to 3D. Furthermore, the definitions of angle γ and angle δ are the same as those in FIGS. 3A to 3D. Accordingly, angle γ is approximately 4 degrees also in FIGS. 4B to 4D.

First, the configuration in FIG. 4A shows the case where angle δ=0 degrees, and thus is the same as the conventional configuration in FIG. 3A. Accordingly, as described with reference to FIG. 3A, light from the outside reflected by concave mirror 12b may enter the driver's eye(s).

Next, as illustrated in FIG. 4B, consider a configuration in which display device 20 is slightly shifted leftward (in the direction away from the driver) in a top view of the mobile body. Accordingly, the position of concave mirror 12b is also rotated clockwise in order that the driver can see light from display device 20. As an example, a case is shown in which the position of display device 20 is slightly shifted leftward at this time in order that angle δ and angle γ satisfy the condition δ<γ. For example, angle δ is 2 degrees. Light from the outside entering from behind the mobile body in this case is reflected by concave mirror 12b and thereafter may reach the driver's left eye side at angle δ made with the straight line that connects the center of the driver's face and the center of the concave mirror as indicated by the dashed line, as compared with FIG. 4A. However, light from the outside reflected by concave mirror 12b reaches a position within width 2X that is a distance between the driver's eyes (the width or the range indicated by the double arrow in FIG. 4B), and thus there still remains a possibility that the reflected light from the outside enters the driver's eye(s) just by the driver moving slightly.

Thus, if angle δ is further increased, the optical path of reflected light from the outside illustrated in FIG. 4B shifts (rotates) leftward and clockwise. Then, when δ=γ, light from the outside reaches the driver's left eye exactly. Accordingly, in the range of δ≤γ, the optical path of reflected light from the outside reaches a position between the driver's right and left eyes. Consequently, the reflected light from the outside reaches the driver's eye(s) just by the driver moving slightly. In other words, in the range of δ>γ, the optical path of reflected light from the outside is further away from a position between the driver's right and left eyes, and thus a possibility that light from the outside reaches the driver's eyes is lowered.

In view of this, as illustrated in FIG. 4C, in a top view of the mobile body, a configuration in which display device 20 is further shifted leftward (in a direction away from the driver). Specifically, the position of display device 20 is shifted so that angle δ and angle γ satisfy the condition δ>γ. According to this, the position of concave mirror 12b is also rotated clockwise in order that the driver can see light from display device 20. Here, an example in which angle δ is 45 degrees (=δ1) is shown in order to satisfy the condition δ>γ. In this case, light from the outside entering from behind the mobile body in this case perpendicularly falls on concave mirror 12b, and thus travels to the rear of the mobile body after being reflected by concave mirror 12b. Accordingly, there is almost no possibility that light from the outside reaches the driver's eye(s).

Next, as illustrated in FIG. 4D, a configuration in which display device 20 is further shifted leftward (in a direction away from the driver) in a top view of the mobile body, as compared with FIG. 4C. Specifically, the position of display device 20 is shifted so that angle δ and angle γ satisfy δ>>γ. According to this, the position of concave mirror 12b is also further rotated clockwise in order that the driver can see light from display device 20. As a result, light from the outside entering from behind the mobile body reflects off concave mirror 12b, and travels to the left half of the rear of the vehicle. Accordingly, there is almost no possibility that light from the outside reaches the driver's eye(s).

Note that as angles that satisfy δ>γ, if angle δ is further increased, when angle δ is 90 degrees or more, as described with reference to FIG. 3D, display device 20 is to be disposed ahead of windshield 3, which cannot be practically achieved.

From the above, similarly to the cases illustrated in FIGS. 3B to 3D, a specific example of predetermined angle δ is 4 degrees<δ<90 degrees also in the configurations illustrated in FIGS. 4B to 4D. Further, similarly to the cases illustrated in FIGS. 3B to 3D, from the viewpoint of the eye box and the viewpoint of the size of support 12a, and further in view of the configuration (δ>δ1=45 degrees) in FIG. 4D, reflected light from the outside may travel toward the passenger seat and reach the eye(s) of a person in the passenger seat, and thus also in the configurations illustrated in FIGS. 4B to 4D, a desirable range of predetermined angle δ is 8 degrees<δ≤δ1 (45 degrees).

The above is a description of the positional relationship of display device 20 relative to optical body 12 and the driver, and the following description is given assuming that a configuration in which desirable predetermined angle δ (8 degrees<δ≤δ1 (45 degrees)) is satisfied, that is, for example, the configuration in FIG. 3C is adopted.

Rear-view mirror 10 can execute a plurality of operation modes by adjusting the orientation of optical body 12 and the orientation of light-transmitting cover 16 described below.

Figure 5A:
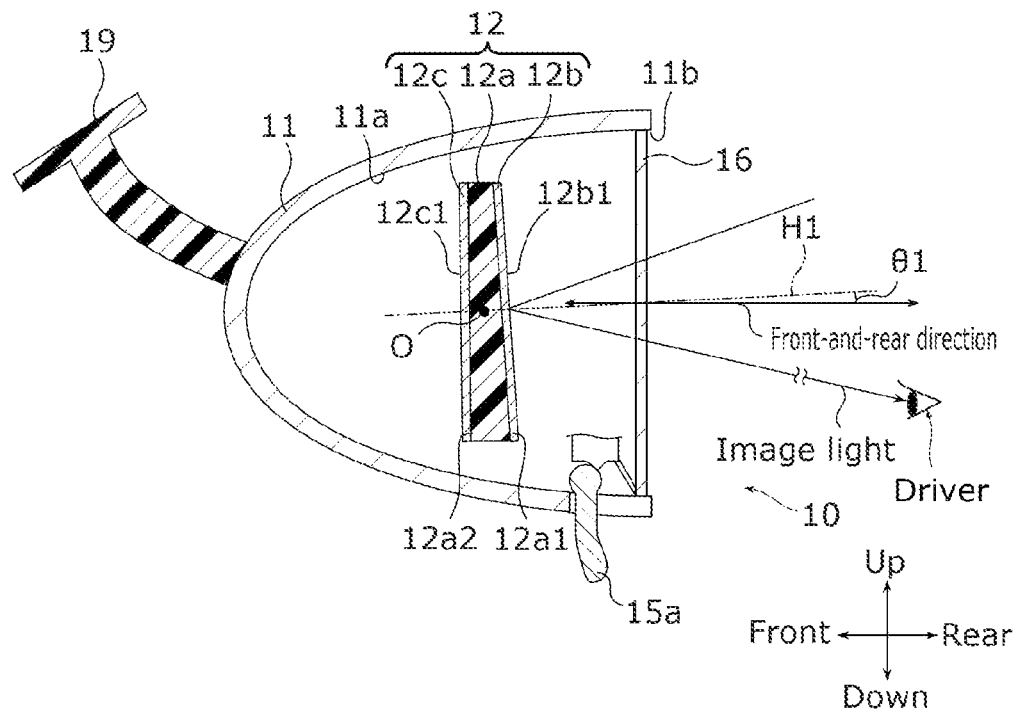
FIG. 5A illustrates the display system according to Embodiment 1, and is a cross-sectional view illustrating an example of a state in which the optical body is placed in a first state as a first mode, and image light enters the rear-view mirror and is reflected, when the rear-view mirror is viewed from the left.
Figure 5B:
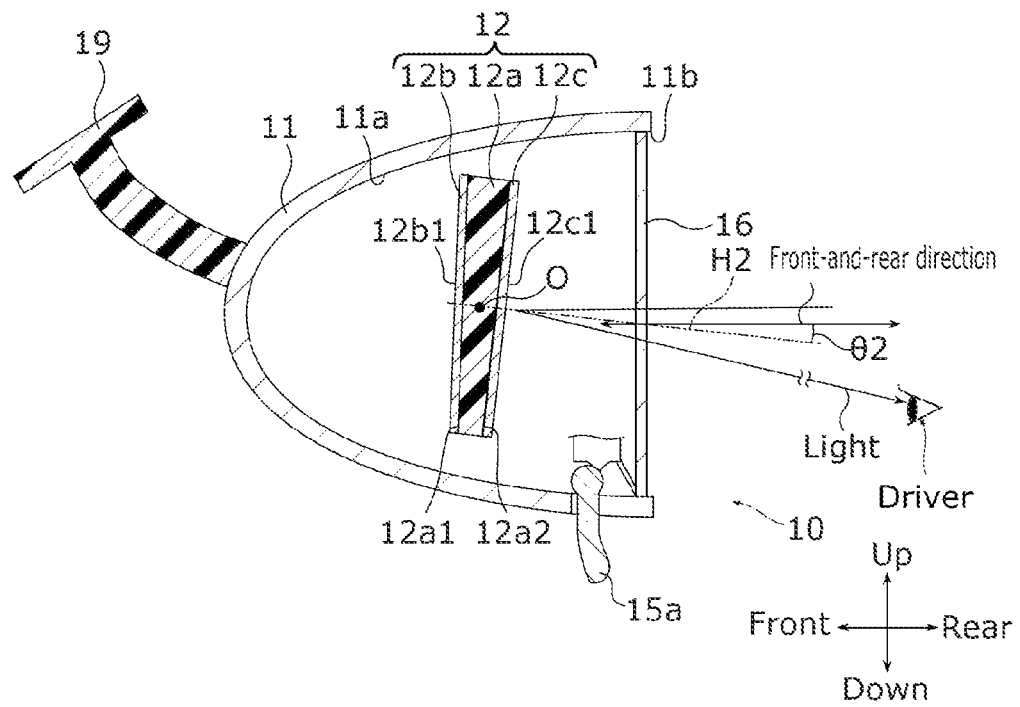
FIG. 5B illustrates the display system according to Embodiment 1, and is a cross-sectional view illustrating an example of a state in which the optical body is placed in a second state as a second mode, and light from behind the mobile body enters the rear-view mirror and is reflected, when the rear-view mirror is viewed from the left.

FIG. 5A illustrates display system 1 according to Embodiment 1, and is a cross-sectional view illustrating an example of a state in which optical body 12 is placed in a first state as the first mode, and image light enters rear-view mirror 10 and is reflected, when rear-view mirror 10 is viewed from the left. Note that in FIG. 5A, only the driver's eye is illustrated for convenience. The same applies to FIG. 5B and subsequent drawings. FIG. 5B illustrates display system 1 according to Embodiment 1, and is a cross-sectional view illustrating an example of a state in which optical body 12 is placed in a second state as the second mode, and light entering from behind the mobile body enters rear-view mirror 10 and is reflected, when rear-view mirror 10 is viewed from the left.

Figure 6B:
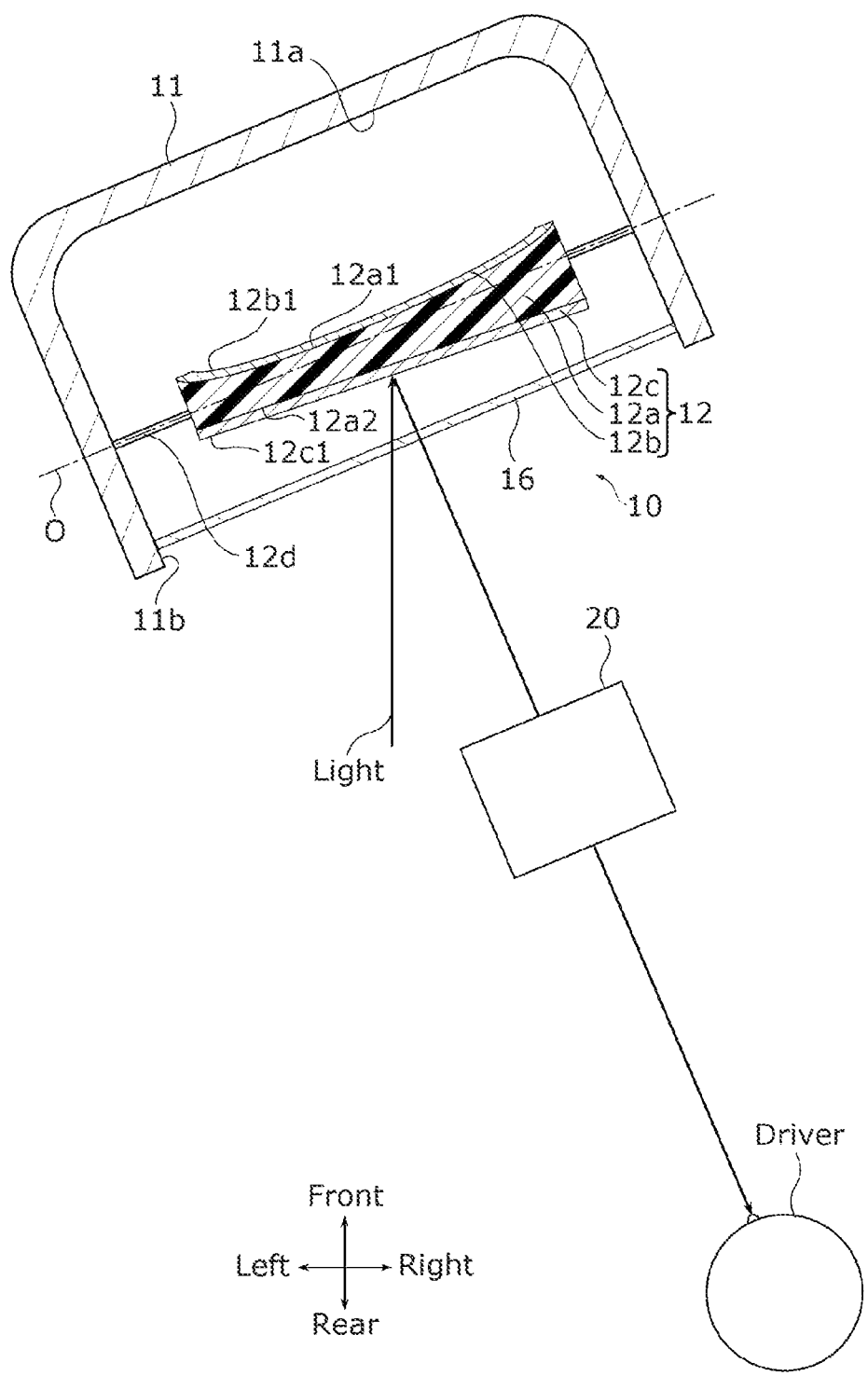
FIG. 6B illustrates the display system according to Embodiment 1, and is a cross-sectional view illustrating an example of a state in which the optical body is placed in the second state as the second mode, and light from behind the mobile body falls onto the optical body and is reflected, when the rear-view mirror is viewed from above.

FIG. 6A illustrates display system 1 according to Embodiment 1, and is a cross-sectional view illustrating an example of a state in which optical body 12 is placed in the first state as the first mode, and image light falls onto optical body 12 and is reflected, when rear-view mirror 10 is viewed from above. FIG. 6B illustrates display system 1 according to Embodiment 1, and is a cross-sectional view illustrating an example of a state in which optical body 12 is placed in the second state as the second mode, and light entering from behind the mobile body falls onto optical body 12 and is reflected when rear-view mirror 10 is viewed from above.

As illustrated in FIGS. 1A to 6B, rear-view mirror 10 includes first casing 11, optical body 12, light-transmitting cover 16, drive controller 17, and driver 18.

As illustrated in FIGS. 5A to 6B, first casing 11 is a storage formed of synthetic resin, for example. First casing 11 has storage space 11a formed inside, and is formed into a rectangular parallelepiped elongated in the lateral direction and having an opening on a side facing the driver if the mobile body is a vehicle. First casing 11 is formed such that the size in the lateral direction relative to the direction in which the mobile body moves is greater than each of the size in the up-and-down direction and the size in the front-and-rear direction. First casing 11 stores optical body 12 and light-transmitting cover 16 in storage space 11a.

First casing 11 rotatably holds optical body 12 inside. First casing 11 rotatably holds optical body 12 in storage space 11a in a state in which optical body 12 is stored in storage space 11a. Specifically, the side walls on both sides of first casing 11 in the lateral direction hold optical body 12 rotatably about shaft center O.

Furthermore, first casing 11 holds light-transmitting cover 16 disposed closer to the driver than optical body 12, that is, on the opening 11b side. Specifically, first casing 11 holds light-transmitting cover 16 in a position where light-transmitting cover 16 does not prevent rotation of optical body 12 in storage space 11a, in a state in which light-transmitting cover 16 is stored in storage space 11a.

Figure 7A:
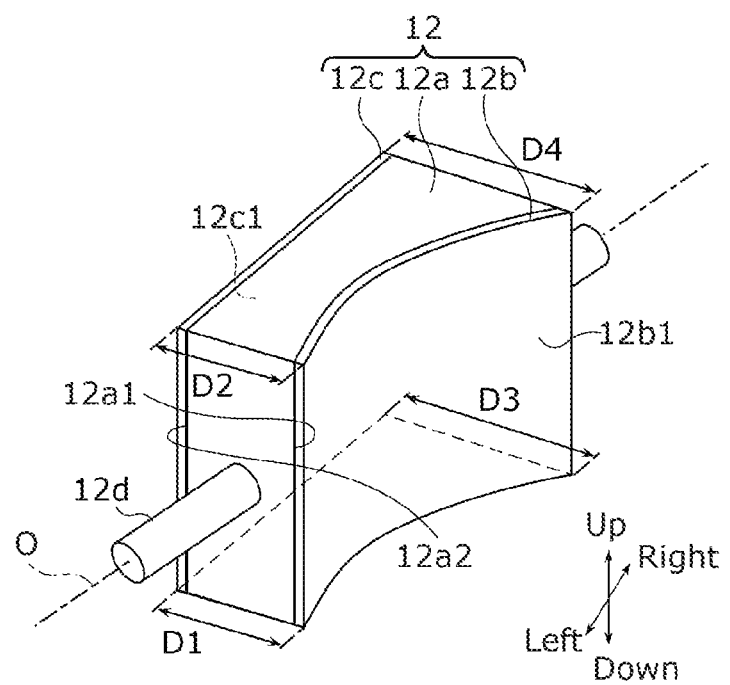
FIG. 7A is a perspective view illustrating an example of the optical body of the display system according to Embodiment 1.
Figure 7B:
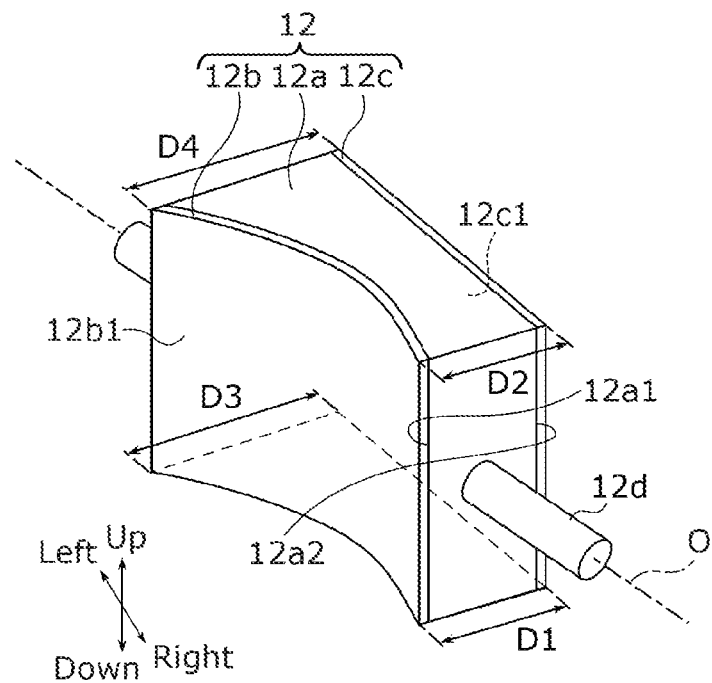
FIG. 7B is a perspective view illustrating an example of the optical body of the display system according to the example of Embodiment 1.

FIGS. 7A and 7B are perspective views of examples of optical body 12 of display system 1 according to Embodiment 1.

As illustrated in FIGS. 7A and 7B, optical body 12 includes support 12a, concave mirror 12b, plane mirror 12c, and rotation shaft 12d.

Support 12a includes first surface 12a1 that supports concave mirror 12b, and second surface 12a2 that supports plane mirror 12c and is opposed to first surface 12a1. First surface 12a1 of support 12a tilts relative to second surface 12a2, and support 12a has a wedge shape when support 12a is viewed in the up-and-down direction. In the present embodiment, support 12a has a flat plate shape elongated in the lateral direction, and the thickness of an end portion in the lateral direction is smaller than the thickness of the other end portion. In the present embodiment, the thickness (lengths D1 and D2 in FIGS. 7A and 7B) of the right end portion of optical body 12 in the lateral direction relative to the direction in which the mobile body moves is smaller than the thickness (lengths D3 and D4 in FIGS. 7A and 7B) of the left end portion of optical body 12.

Support 12a supports concave mirror 12b and plane mirror 12c such that concave mirror 12b and plane mirror 12c overlap when the mirrors are viewed in the front-and-rear direction of the mobile body. In other words, support 12a is located between concave mirror 12b and plane mirror 12c such that concave mirror 12b and plane mirror 12c are on the opposite sides of support 12a. Specifically, in support 12a, concave mirror 12b is fixed to first surface 12a1, and plane mirror 12c is fixed to second surface 12a2 such that plane mirror surface 12c1 tilts relative to a plane perpendicular to normal direction H1 at the center of concave mirror surface 12b1. Stated differently, support 12a supports plane mirror 12c and concave mirror 12b such that the lateral direction of concave mirror 12b tilts relative to plane mirror 12c.

As illustrated in FIGS. 6A, 6B, 7A, and 7B, support 12a includes rotation shaft 12d supported on the side walls on the two sides of first casing 11 in the lateral direction in a state in which support 12a supports concave mirror 12b and plane mirror 12c. Rotation shaft 12d includes a pair of cylindrical protrusions, and is rotatably supported on the side walls on the two sides in the lateral direction.

A gear mechanism, the rotation of which is automatically controlled by driver 18 in FIG. 2, is connected to rotation shaft 12d. Driver 18 in FIG. 2 controls driving of the gear mechanism so that rotation shaft 12d rotates about shaft center O, and thus optical body 12 rotates.

Concave mirror 12b includes concave mirror surface 12b1 on which image light emitted through display surface 21a of display device 20 directly or indirectly falls and which reflects the incident image light. When concave mirror 12b faces opening 11b of first casing 11 (in the first mode), that is, faces the driver, concave mirror surface 12b1 reflects image light emitted through display surface 21a of display device 20 toward the driver. In the first mode, concave mirror surface 12b1 displays a virtual image of a display image shown by image light emitted by display device 20. "Directly falling on" means that image light emitted through display surface 21a directly falls on concave mirror surface 12b1 not via optical member 25 in FIG. 1A. "Indirectly falling on" means that image light emitted through display surface 21a falls on concave mirror surface 12b1 via optical member 25 in FIG. 1A. Optical member 25 in FIG. 1A is a light reflecting member such as a mirror that reflects light or a light guide member that guides light, for instance.

Concave mirror 12b overlaps support 12a? with concave mirror surface 12b1 facing opposite support 12a, and is supported by and fixed to first surface 12a1 of support 12a. Specifically, concave mirror 12b curves circularly along shaft center O, and is supported by and fixed to first surface 12a1 of support 12a, such that both end portions of concave mirror 12b in the lateral direction are more distant from plane mirror 12c than a center portion.

Plane mirror 12c is disposed on the support so as to face in the opposite direction to the direction in which concave mirror 12b faces. Plane mirror 12c overlaps support 12a with plane mirror surface 12c1 facing opposite support 12a, and is supported by and fixed to second surface 12a2 of support 12a.

Plane mirror 12c includes plane mirror surface 12c1 for displaying an object behind the mobile body by reflecting light that has entered from behind the mobile body. When plane mirror 12c faces opening 11b of first casing 11 (in the second mode), that is, when plane mirror surface 12c1 faces the driver, plane mirror 12c reflects light that has entered from behind the mobile body toward the driver. Plane mirror surface 12c1 displays a rear-view image shown by light that has entered the mobile body, in the second mode.

Rotation shaft 12d is disposed along the lateral direction relative to the direction in which the mobile body moves, and rotatably supports concave mirror 12b and plane mirror 12c inside of first casing 11. Specifically, rotation shaft 12d is formed on two end surfaces of the support in the lateral direction, and protrudes from the two end surfaces. In the present embodiment, the axial direction of rotation shaft 12d is substantially parallel to the lateral direction of concave mirror surface 12b1.

Rotating operation of such optical body 12 switches the orientation of optical body 12 between the first state and the second state. In other words, the orientation is switched between the first mode and the second mode.

The first state is a state in which concave mirror 12b of optical body 12 faces opening 11b of first casing 11, that is, faces the driver when the first mode is executed. The first state can also be referred to as an orientation (a first orientation) of optical body 12. In the first state, image light emitted through display surface 21a of display device 20 directly or indirectly falls on concave mirror surface 12b1, and the incident image light is reflected toward the driver's eye(s).

The second state is a state in which plane mirror 12c of optical body 12 faces opening 11b of first casing 11, that is, faces the driver when the second mode is executed. The second state can also be referred to as an orientation (a second orientation) of optical body 12. In the second state, light from behind the mobile body falls on and reflected by plane mirror surface 12c1 toward the driver's eye(s).

Specifically, as illustrated in FIGS. 5A and 5B, normal direction H1 at the center of concave mirror surface 12b1 when the first mode is functioning and normal direction H2 that is normal to plane mirror surface 12c1 when the second mode is functioning are not parallel. Specifically, optical body 12 has a configuration in which angle θ1 between the front-and-rear direction and normal direction H1 at the center of concave mirror surface 12b1 in the first mode is different from angle G2 between the front-and-rear direction and normal direction H2 that is normal to plane mirror surface 12c1 in the second state. An angle in the first state between the direction in which image light falls onto concave mirror surface 12b1 and the direction in which the image light reflects off concave mirror surface 12b1 and travels toward the driver is greater than an angle in the second state between a direction in which light from behind the mobile body falls onto plane mirror surface 12c1 and a direction in which the light reflects off plane mirror surface 12c1 and travels toward the driver.

Optical body 12 has a wedge shape when optical body 12 is viewed in the up-and-down direction of the mobile body. Specifically, a distance between plane mirror 12c and concave mirror 12b at an end portion on one side is shorter than a distance between plane mirror 12c and concave mirror 12b at an end portion on the other side in the lateral direction relative to the direction in which the mobile body moves. As illustrated in FIG. 7A, when optical body 12 is viewed from above, length D2 along an end portion on one side is shorter than length D4 along an end portion on the other side in the lateral direction. When optical body 12 is viewed from below, length D1 along an end portion on the one side is shorter than length D3 along an end portion on the other side in the lateral direction.

As illustrated in FIGS. 5A and 5B, light-transmitting cover 16 is closer to the driver than optical body 12, and is held by first casing 11, covering opening 11b of first casing 11. Light-transmitting cover 16 is made of a resin that transmits visible light, for example.

Note that plane mirror 12c may have an anti-glare function. In this case, for example, when plane mirror 12c faces opening 11b of first casing 11 (in the second mode), if the driver feels that reflected light from headlights of the vehicle behind is glaring, the driver can change tilt of first casing 11 through operation of turning lever 15a. Accordingly, plane mirror 12c functions as an anti-glare mirror.

Here, when concave mirror 12b faces opening 11b of first casing 11 (in the first mode), display controller 22, for example, controls light source 23 according to the brightness of a rear-view image captured by imaging unit 31, and automatically carries out the anti-glare function. Accordingly, when the second mode is switched to the first mode, even if the tilt of first casing 11 has been changed by lever 15a, the tilt of first casing 11 returns to the original state in conjunction with the operation of switching to the first mode. Accordingly, the angle of concave mirror 12b in the first mode is fixed irrespective of the operating condition of lever 15a, and the driver can see a virtual image of a rear-view image.

Note that a configuration in which opening 11b of first casing 11 is provided with light-transmitting cover 16 is described here, yet a configuration may be adopted in which light-transmitting cover 16 can change the reflectance using a liquid crystal, for example. In this case, in the state of being in the second mode, display controller 22 controls the reflectance of the liquid crystal according to the brightness of the rear-view image captured by imaging unit 31. Such a configuration may allow the second mode to have an automatic anti-glare function. Accordingly, the anti-glare function in the second mode can be automatically achieved. Also in this configuration, when the second mode is switched to the first mode, display controller 22 controls to stop controlling reflectance of the liquid crystal.

As illustrated in FIGS. 1A to 6B, drive controller 17 executes a plurality of operation modes by controlling driver 18. In the present embodiment, drive controller 17 can execute a desired mode out of a plurality of operation modes including the first mode and the second mode.

For example, drive controller 17 switches between the first mode and the second mode by controlling driver 18. Specifically, upon obtaining, from input receiver 32, a control instruction for switching optical body 12 from the first state to the second state (which may be referred to as a first control instruction in the following), drive controller 17 controls rotation of optical body 12 via driver 18 to rotate optical body 12 so that plane mirror surface 12c1 of plane mirror 12c faces the driver. Thus, drive controller 17 switches from the first mode to the second mode. Accordingly, plane mirror surface 12c1 of plane mirror 12c faces the driver.

Upon receiving, from input receiver 32, a control instruction for switching optical body 12 from the second state to the first state (which may be referred to as a second control instruction in the following), drive controller 17 controls rotation of optical body 12 via driver 18 to rotate optical body 12 so that concave mirror surface 12b1 of concave mirror 12b faces the driver. Thus, drive controller 17 switches from the second mode to the first mode. Accordingly, concave mirror surface 12b1 of concave mirror 12b faces the driver.

Note that when a failure occurs in display surface 21a of display device 20, drive controller 17 does not need to output the control instruction for switching optical body 12 from the second state to the first state. In this case, drive controller 17 may switch optical body 12 to the second state if optical body 12 is in the first state. Drive controller 17 may operate in the above manner by obtaining a failure signal from display device 20.

Driver 18 is an actuator that rotates optical body 12. Driver 18 switches optical body 12 between the first state and the second state according to a control instruction obtained from drive controller 17, to control rotation of optical body 12. Upon obtaining the first control instruction, driver 18 switches optical body 12 from the first state to the second state by rotating optical body 12 about shaft center O. Upon obtaining the second control instruction, driver 18 switches optical body 12 from the second state to the first state by rotating optical body 12 about shaft center O.

[Input Receiver 32]

Input receiver 32 is an input interface that receives an input operation for executing the first mode or the second mode made by a driver. Input receiver 32 outputs, to drive controller 17, a control instruction according to an operation input by the driver. Input receiver 32 may be an exclusive use switch provided in the center console, for example.

<Processing>

Figure 8:
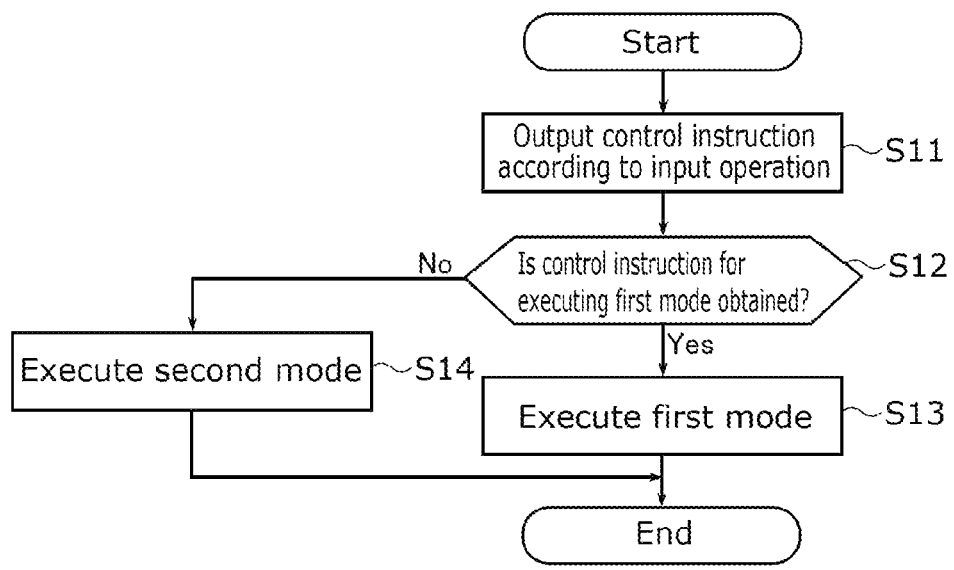
FIG. 8 is a flowchart illustrating an example of processing of the rear-view mirror of the display system according to Embodiment 1.

FIG. 8 is a flowchart illustrating an example of processing of rear-view mirror 10 of display system 1 according to Embodiment 1.

First, as illustrated in FIG. 8, input receiver 32 receives an input operation for executing the first mode or the second mode made by a driver. Input receiver 32 outputs a control instruction according to the input operation to drive controller 17 (S11).

Next, drive controller 17 determines whether the control instruction for executing the first mode is obtained (S12).

If the control instruction for executing the first mode is obtained (Yes in S12), drive controller 17 executes the first mode (S13). For example, if the second mode is executed, drive controller 17 switches from the second mode to the first mode. Specifically, if the control instruction for switching optical body 12 from the second state to the first state is obtained from input receiver 32, drive controller 17 controls driver 18 to rotate optical body 12. If the instruction is obtained from drive controller 17, driver 18 rotates optical body 12 approximately 180 degrees so that concave mirror surface 12b1 of concave mirror 12b faces the driver. Accordingly, concave mirror surface 12b1 of concave mirror 12b in optical body 12 faces the driver. Then, display system 1 ends the processing.

If the control instruction for executing the second mode is obtained (No in S12), drive controller 17 executes the second mode (S14). For example, if the first mode is being executed, drive controller 17 switches from the first mode to the second mode. Specifically, if the control instruction for switching optical body 12 from the first state to the second state is obtained from input receiver 32, drive controller 17 controls driver 18 to rotate optical body 12. If the instruction is obtained from drive controller 17, driver 18 rotates optical body 12 approximately 180 degrees so that plane mirror surface 12c1 of plane mirror 12c faces the driver. Accordingly, plane mirror surface 12c1 of plane mirror 12c in optical body 12 faces the driver. Then, display system 1 ends the processing.

Example

Figure 6C:
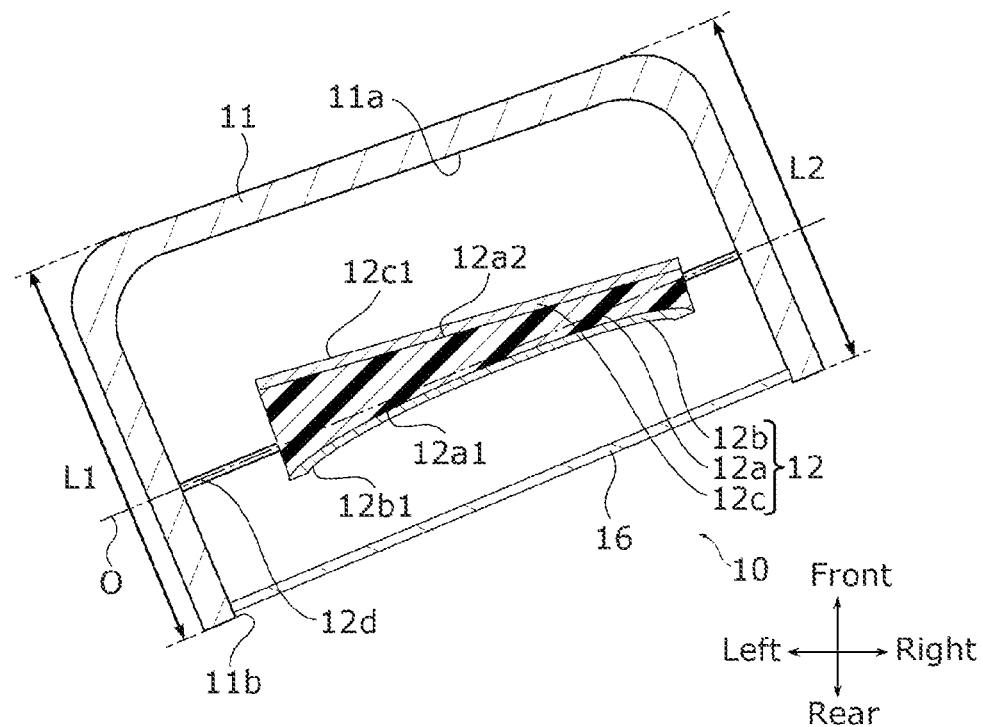
FIG. 6C illustrates the display system according to an example of Embodiment 1, and is a cross-sectional view illustrating an exemplary case where the rear-view mirror is viewed from above.
Figure 6D:
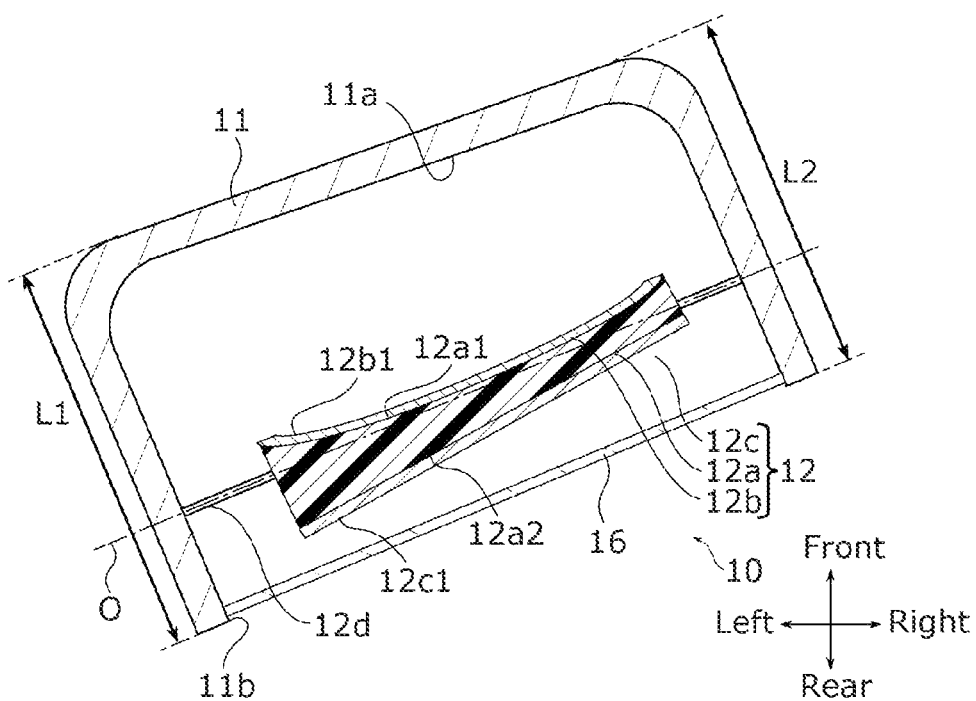
FIG. 6D illustrates the display system according to the example of Embodiment 1, and is a cross-sectional view illustrating an exemplary case where the rear-view mirror is viewed from above.

FIG. 6C illustrates display system 1 according to an example of Embodiment 1, and is a cross-sectional view illustrating an example of a case where rear-view mirror 10 is viewed from above. FIG. 6D illustrates display system 1 according to the example of Embodiment 1, and is a cross-sectional view illustrating an example of a case where rear-view mirror 10 is viewed from above. FIG. 7B is a perspective view illustrating an example of optical body 12 of display system 1 according to the example of Embodiment 1.

In this example, a distance between plane mirror 12c and concave mirror 12b at an end portion of optical body 12 on the side closer to the driver (the right side in FIGS. 6C and 6D) may be shorter than a distance between plane mirror 12c and concave mirror 12b at an end portion on the side far from the driver (the left side in FIGS. 6C and 6D). As illustrated in FIG. 7B, length D2 at the right end may be shorter than length D4 at the left end in the lateral direction when optical body 12 is viewed from above. When optical body 12 is viewed from below, length D1 at the right end may be shorter than length D3 at the left end in the lateral direction. In this case, length L2 of first casing 11 on the right in the front-and-rear direction can be made shorter than length L1 of first casing 11 on the left.

<Operation Effect>

Operation effects of display system 1 according to the present embodiment are to be described.

Display system 1 according to the present embodiment includes: display device 20 (a display) provided in a mobile body; concave mirror 12b for displaying, in a first mode, a virtual image of a display image shown by image light emitted by display device 20; and plane mirror 12c for reflecting, in a second mode, a rear-view image shown by light that has entered the mobile body. In a top view of the mobile body, display device 20 and concave mirror 12b are disposed such that a straight line that connects a center of display device 20 and a center of concave mirror 12b has predetermined angle δ relative to a front-and-rear direction of the mobile body, and a normal direction at a center of a concave mirror surface of concave mirror 12b when the first mode is functioning and a normal direction that is normal to a plane mirror surface of plane mirror 12c when the second mode is functioning are not parallel to each other.

According to this, the orientation of concave mirror 12b can be tilted for predetermined angle δ relative to the front-and-rear direction of the mobile body in order to avoid the straight line that connects display device 20 and concave mirror 12b matching the front-and-rear direction of the mobile body. Accordingly, even if light from the outside such as light from headlights of a vehicle behind falls onto concave mirror 12b, reflection of the light toward the driver's eyes can be inhibited, and thus a possibility that light from the outside reflects off concave mirror 12b and enters the driver's sight can be lowered.

Furthermore, the normal direction at the center of concave mirror surface 12b1 in the first mode and the normal direction that is normal to plane mirror surface 12c1 in the second mode are not parallel to each other. Consequently, concave mirror 12b and plane mirror 12c can be disposed such that, for example, the reflection direction in which image light falls on and reflects off concave mirror surface 12b1 and the reflection direction in which light falls on and reflects off plane mirror surface 12c1 are directed to the driver. Accordingly, when the first mode and the second mode are switched, the amount of adjusting the positions of concave mirror 12b and plane mirror 12c in the horizontal direction can be decreased.

Accordingly, light from the outside can be prevented from being reflected toward the driver, and concave mirror 12b and plane mirror 12c can be readily switched. In particular, in display system 1, the display modes according to image light and light from the outside can be readily adjusted.

Figure 9A:
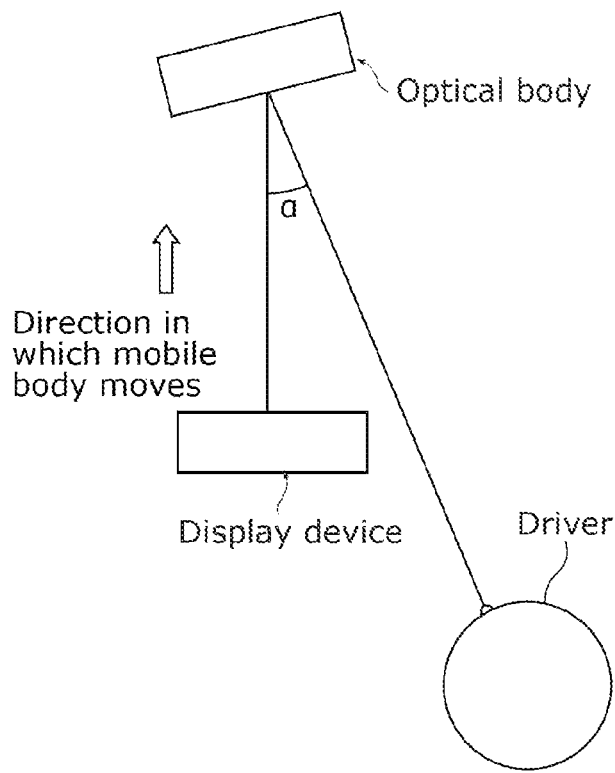
FIG. 9A is a view illustrating a position of the display device relative to the optical body and a driver.
Figure 9B:
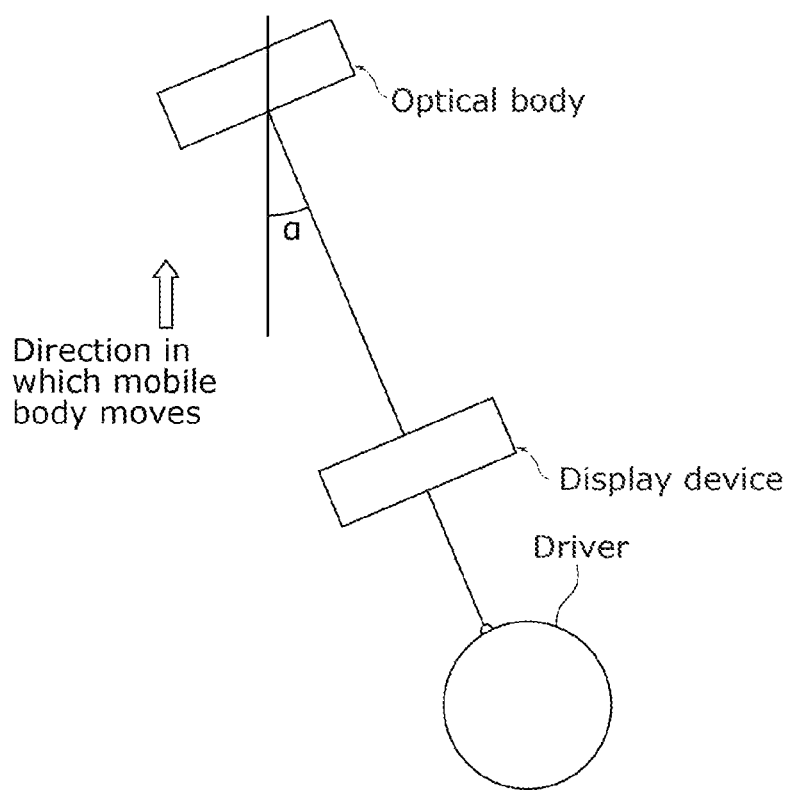
FIG. 9B is another view illustrating a position of the display device relative to the optical body and a driver.

FIGS. 9A and 9B illustrate cases where display system 1 is viewed from above. FIGS. 7A and 7B illustrate cases where display system 1 is viewed from above.

FIG. 9A is a view illustrating a position of the display device relative to the optical body and the driver. FIG. 9B is another view illustrating a position of the display device relative to the optical body and the driver.

In FIG. 9A, the display device is disposed such that the emission direction of image light emitted by the display device and the direction in which the mobile body moves match. Or stated differently, the display device is not disposed on a straight line that connects the center of the optical body and the center of the driver. On the other hand, in FIG. 9B, the display device is disposed between the optical body and the driver, and the normal direction normal to the concave mirror surface and the normal direction normal to the plane mirror surface match. With this configuration, if the driver wishes to see a display image and a rear-view image, the position of the optical body needs to be adjusted relative to the horizontal direction each time the first mode and the second mode are switched.

A reason for this is as follows. In order to allow the concave mirror to reflect image light emitted by the display device toward the driver, an angle between the normal direction at the center of the concave mirror surface provided in the optical body and the direction in which the concave mirror reflects light tends to be small. Accordingly, if the first mode is merely switched to the second mode, the straight line that connects the center of the plane mirror surface and the center of the driver substantially matches the normal line at the center of the plane mirror surface, and thus it is difficult for the plane mirror surface to reflect light (showing a rear-view image) from behind the mobile body to an observer.

As a result, a display image shown by image light and a rear-view image shown by light from behind the mobile body are less likely to appear appropriately to the driver on the optical body. Accordingly, the driver needs to operate the optical body so that a display image or a rear-view image can be seen, and needs to finely adjust the position of the optical body.

In view of the above, display system 1 according to the present embodiment includes: display device 20 provided in a mobile body; concave mirror 12b for displaying, in a first mode, a virtual image of a display image shown by image light emitted by display device 20; and plane mirror 12c for reflecting, in a second mode, a rear-view image shown by light that has entered the mobile body. Display device 20 is disposed closer to the driver relative to the front-and-rear direction of the mobile body than at least concave mirror 12b is, and normal direction H1 at a center of concave mirror surface 12b1 of concave mirror 12b when the first mode is functioning and normal direction H2 that is normal to plane mirror surface 12c1 of plane mirror 12c when the second mode is functioning are not parallel to each other.

According to this, normal direction H1 at the center of concave mirror surface 12b1 in the first mode and normal direction H2 normal to plane mirror surface 12c1 in the second mode are not parallel to each other. Thus, concave mirror 12b and plane mirror 12c can be disposed such that, for example, the reflection direction in which image light falls on and reflects off concave mirror surface 12b1 and the reflection direction in which light falls on and reflects off plane mirror surface 12c1 are directed to the driver. Consequently, when the first mode and the second mode are switched, the amount of adjusting the position of display system 1 in the horizontal direction can be reduced.

Thus, the display modes according to image light and light from the outside can be readily adjusted.

In display system 1 according to the present embodiment, in the top view of the mobile body, predetermined angle δ ranges from lower limit angle γ to an upper limit angle, lower limit angle γ being (i) obtained based on a distance (2X) between eyes of a person (a driver) in the mobile body who sees concave mirror 12b, and a length (L) of a straight line that connects a middle point between the eyes and the center of concave mirror 12b, and (ii) formed between the straight line and a straight line that connects one of the eyes and the center of concave mirror 12b, the upper limit angle being formed between a straight line extending in a lateral direction relative to a direction in which the mobile body moves and passing through the center of concave mirror 12b and a straight line extending in the front-and-rear direction of the mobile body and passing through the center of concave mirror 12b.

According to this, in the range of the predetermined angle, the straight line that connects display device 20 and concave mirror 12b is tilted relative to the front-and-rear direction of the mobile body, so that light from the outside reflects in a direction other than the direction toward the driver's eye(s). Thus, a possibility that light from the outside reflects off concave mirror 12b and enters the driver's sight can be further inhibited.

In display system 1 according to the present embodiment, a line passing through the center of display device 20 and extending along display device 20 and a tangent at the center of concave mirror 12b are parallel to each other.

According to this, even if display device 20 is disposed in an orientation in which the straight line that connects display device 20 and concave mirror 12b is tilted relative to the front-and-rear direction of the mobile body, the lengths of optical paths between display device 20 and concave mirror 12b are substantially the same, and thus distortion of an image appearing in concave mirror 12b, which the driver can see, can be reduced.

In display system 1 according to the present embodiment, display device 20 is disposed closer to a driver of the mobile body than to a straight line that is parallel to the front-and-rear direction of the mobile body and passes through the center of concave mirror 12b.

According to this, an angle between a straight line that connects display device 20 and concave mirror 12b and a straight line that connects concave mirror 12b and the driver is decreased, and thus an overall difference of the lengths of light paths is decreased so that image distortion can be decreased.

In display system 1 according to the present embodiment, concave mirror 12b and plane mirror 12c are stored in first casing 11, and first casing 11 includes rotation shaft 12d for rotating concave mirror 12b and plane mirror 12c inside of first casing 11.

According to this, concave mirror 12b and plane mirror 12c can be rotated by rotating rotation shaft 12d. Accordingly, the first mode and the second mode can be readily switched by merely rotating rotation shaft 12d. If concave mirror 12b and plane mirror 12c are disposed such that the reflection direction in which image light falls on and reflects off concave mirror surface 12b1 and the reflection direction in which light falls on and reflects off plane mirror surface 12c1 are directed to the driver, image light reflecting off concave mirror surface 12b1 and light reflecting off plane mirror surface 12c1 can be caused to travel toward the driver by rotating the rotation shaft for the same amount when switching to either of the modes.

Display system 1 according to the present embodiment further includes: optical body 12 that includes concave mirror 12b and plane mirror 12c. Plane mirror 12c is opposed to concave mirror 12b such that plane mirror surface 12c1 faces outward, and optical body 12 has a wedge shape when optical body 12 is viewed in an up-and-down direction of the mobile body.

According to this, plane mirror 12c and concave mirror 12b can be disposed on the opposite sides of the optical body, and furthermore the orientation of concave mirror 12b can be tilted relative to the orientation of plane mirror 12c in the front-and-rear direction of the mobile body and along the horizontal plane. Thus, when the first mode and the second mode are switched, the amount of adjusting the position of display system 1 in the horizontal direction can be reduced.

In display system 1 according to the present embodiment, a distance between plane mirror 12c and concave mirror 12b at an end portion of optical body 12 closer to a driver of the mobile body in a lateral direction is shorter than a distance between plane mirror 12c and concave mirror 12b at an end portion of optical body 12 farther from the driver in the lateral direction, the lateral direction being a direction relative to a direction in which the mobile body moves.

According to this, when optical body 12 is disposed obliquely forward relative to the driver, if the thickness of optical body 12 at an end portion closer to the driver is made less than the thickness of optical body 12 at the other end portion, length L1 of first casing 11 on the right side (the side closer to the driver) can be made shorter than length L2 of first casing 11 on the left side (the side farther from the driver), as illustrated in FIGS. 6A and 6B. Accordingly, the region in the console of the mobile body in which display system 1 is disposed can be effectively utilized.

Variation 1 of Embodiment 1

Display system 1 of this variation is to be described.

Figure 10A:
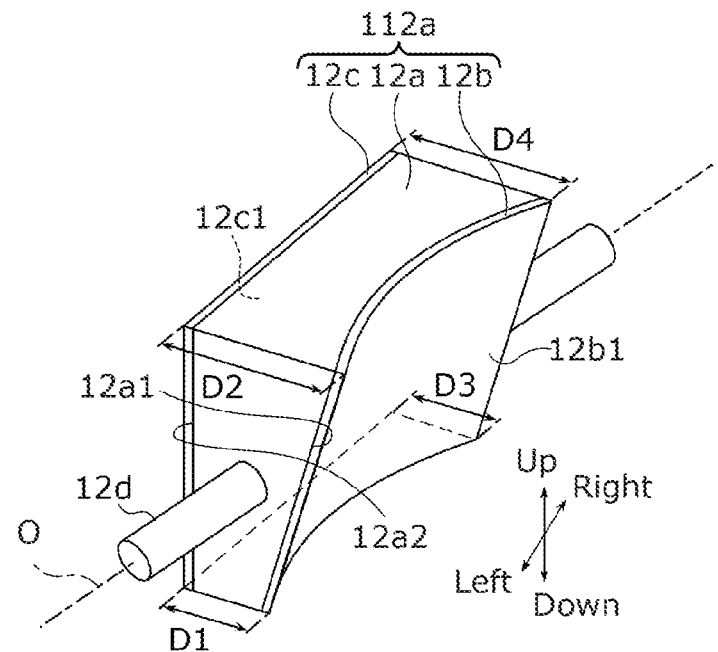
FIG. 10A is a perspective view illustrating an example of an optical body of the display system according to Variation 1 of Embodiment 1.

FIG. 10A is a perspective view illustrating an example of optical body 112a of display system 1 according to Variation 1 of Embodiment 1.

As illustrated in FIG. 10A, this variation is different from Embodiment 1 in that optical body 112a has a wedge shape when optical body 112a is viewed in the lateral direction. Other features in this variation are the same as those in Embodiment 1 unless otherwise specified, and the same numeral is given to the same feature so that a detailed description of the feature is omitted.

When optical body 112a is viewed from above, length D2 along an end portion on one side is substantially the same as length D4 along an end portion on the other side in the lateral direction. When optical body 112a is viewed from below, length D1 along an end portion on one side is substantially the same as length D3 along an end portion on the other side in the lateral direction. Lengths D2 and D4 are longer than lengths D1 and D3. Stated differently, optical body 112a has a wedge shape when optical body 112a is viewed in the lateral direction relative to the direction in which the mobile body moves.

As described above, in display system 1 according to this variation further includes: optical body 112a that includes concave mirror 12b and plane mirror 12c. Plane mirror 12c faces in a direction opposite to a direction in which concave mirror 12b faces, and optical body 112a has a wedge shape when optical body 112a is viewed in a lateral direction relative to a direction in which the mobile body moves.

According to this, plane mirror 12c and concave mirror 12b can be disposed on the opposite sides of the optical body, and furthermore the orientation of concave mirror 12b can be tilted relative to the orientation of plane mirror 12c, in the front-and-rear direction of the mobile body and along the plane vertical to plane mirror surface 12c1. Thus, when the first mode and the second mode are switched, the amount of adjusting the position of display system 1 in the horizontal direction can be reduced.

This variation also yields equivalent operation effects to those described above.

Variation 2 of Embodiment 1

Figure 10B:
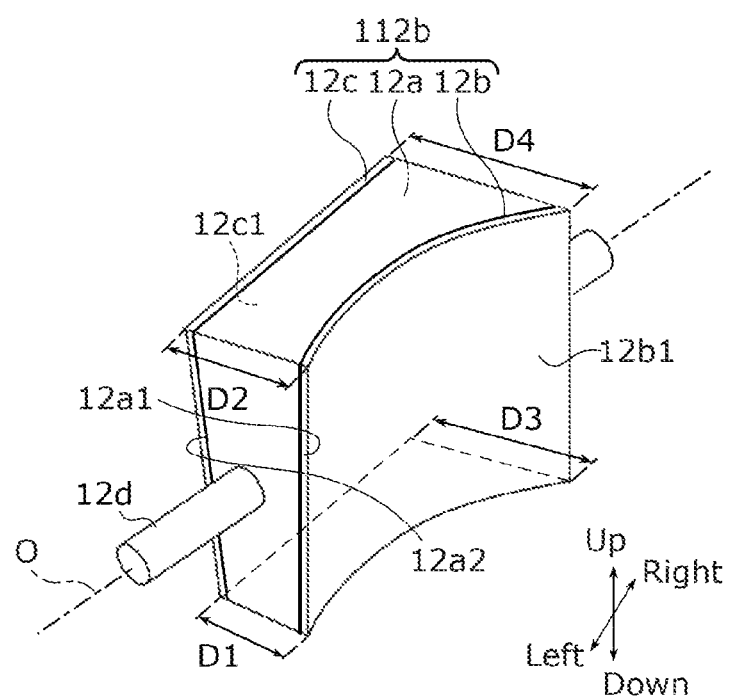
FIG. 10B is a perspective view illustrating an example of an optical body of the display system according to Variation 2 of Embodiment 1.

Display system 1 according to this variation is to be described. FIG. 10B is a perspective view illustrating an example of optical body 112b of display system 1 according to Variation 2 of Embodiment 1.

As illustrated in FIG. 10B, this variation is different from Embodiment 1 in that optical body 112b has a wedge shape when optical body 112b is viewed in the up-and-down direction and the lateral direction. Other features in this variation are the same as those in Embodiment 1 unless otherwise specified, and the same numeral is given to the same feature so that a detailed description of the feature is omitted.

When optical body 112b is viewed from above, length D2 along an end portion on one side is shorter than length D4 along an end portion on the other side in the lateral direction. When optical body 112b is viewed from below, length D1 along an end portion on one side is shorter than length D3 along an end portion on the other side in the lateral direction. Stated differently, optical body 112b has a wedge shape when optical body 112b is viewed in the up-and-down direction of the mobile body.

When optical body 112b is viewed from one side in the lateral direction, length D2 along an upper end portion is longer than length D1 along a lower end portion. When optical body 112b is viewed from the other side in the lateral direction, length D4 along an upper end portion is longer than length D3 along a lower end portion. Stated differently, optical body 112b has a wedge shape also when optical body 112b is viewed in the lateral direction relative to the direction in which the mobile body moves.

This variation also yields equivalent operation effects to those described above.

Variation 3 of Embodiment 1

Display system 1 according to this variation is to be described.

Figure 10C:
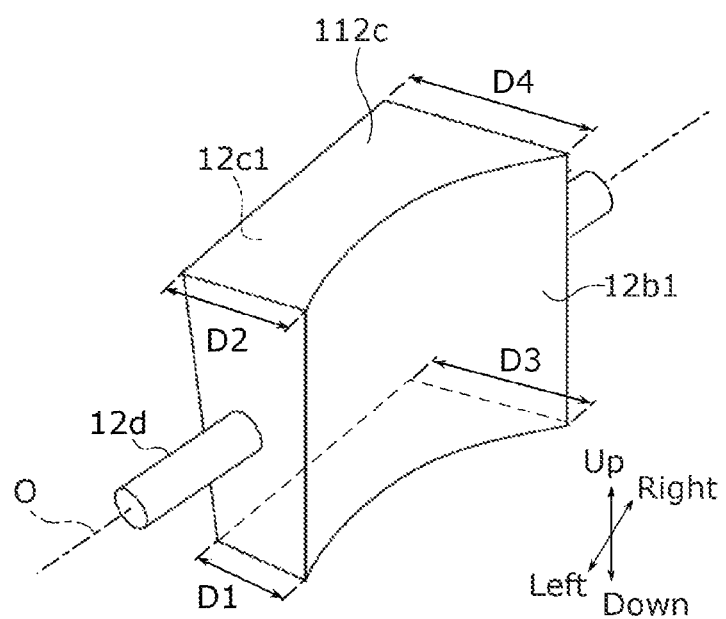
FIG. 10C is a perspective view illustrating an example of an optical body of the display system according to Variation 3 of Embodiment 1.

FIG. 10C is a perspective view illustrating an example of optical body 112c of display system 1 according to Variation 3 of Embodiment 1.

As illustrated in FIG. 10C, this variation is different from Embodiment 1 in that the concave mirror, the plane mirror, and the support are integrally formed into single optical body 112c. Other features in this variation are the same as those in Embodiment 1 unless otherwise specified, and the same numeral is given to the same feature so that a detailed description of the feature is omitted.

Optical body 112c includes concave mirror surface 12b1 formed on one side, and plane mirror surface 12c1 formed on the other side that is a surface opposite concave mirror surface 12b1. Concave mirror surface 12b1 and plane mirror surface 12c1 are, for example, polished to cause specular reflection. Thus, concave mirror surface 12b1 and plane mirror surface 12c1 are formed by the same member and thus are inseparable.

This variation also yields equivalent operation effects to those described above.

Variation 4 of Embodiment 1

Display system 1 according to this variation is to be described.

Figure 11A:
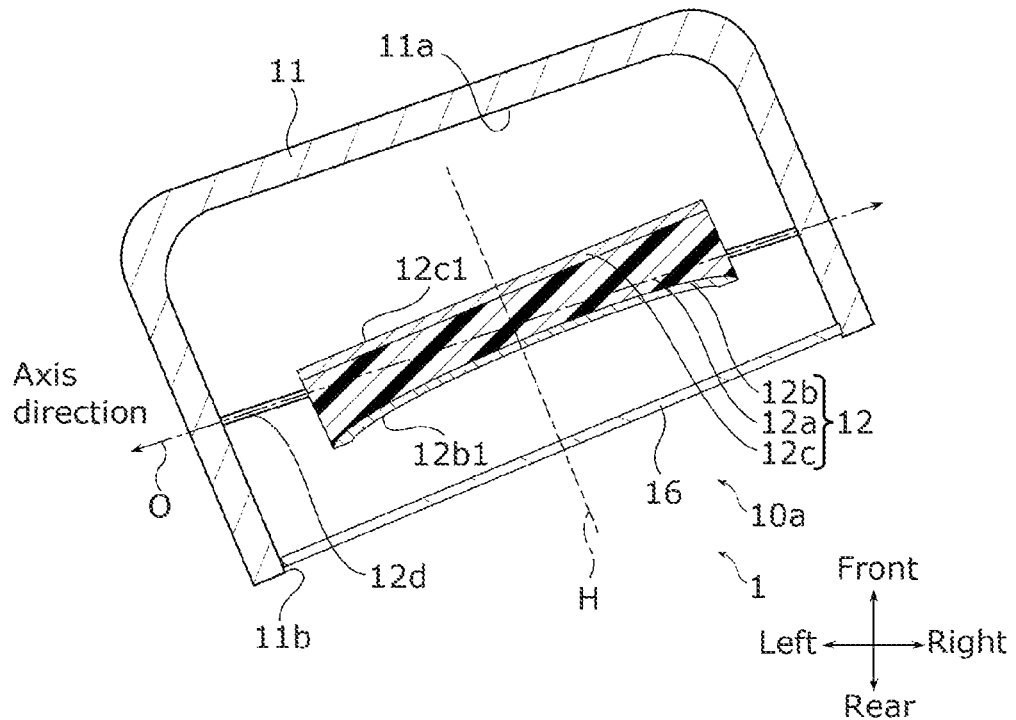
FIG. 11A illustrates the display system according to Variation 4 of Embodiment 1, and is a cross-sectional view illustrating an example of a state in which the optical body is placed in the first state as the first mode, and image light enters a rear-view mirror and is reflected, when the rear-view mirror is viewed from above.
Figure 11B:
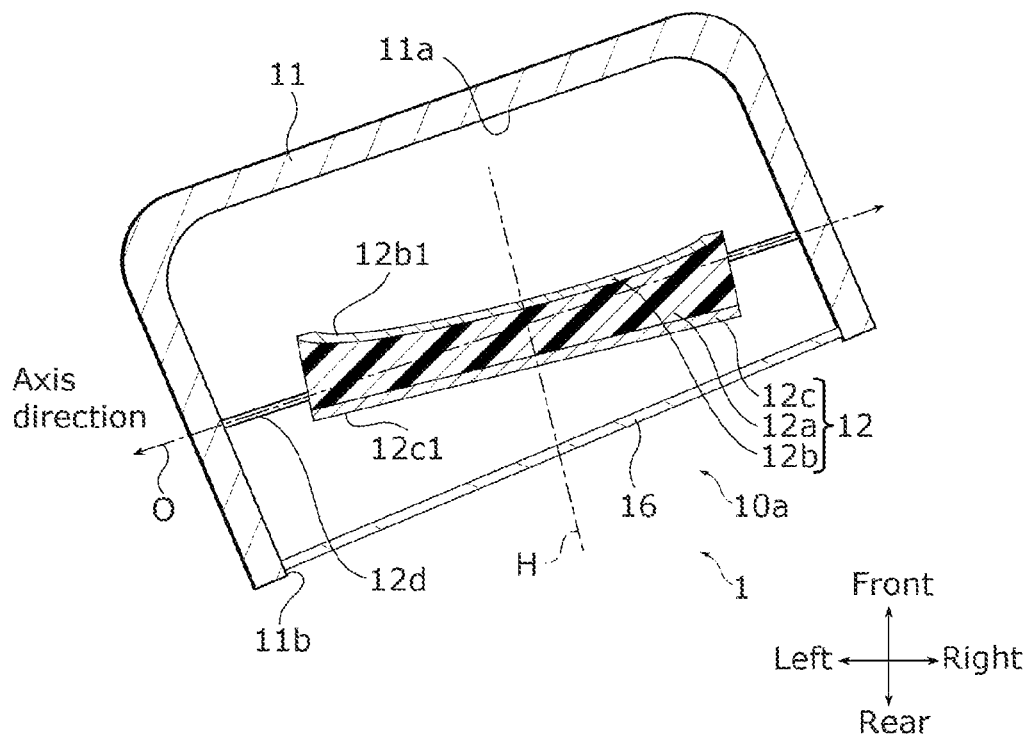
FIG. 11B illustrates the display system according to Variation 4 of Embodiment 1, and is a cross-sectional view illustrating an example of a state in which the optical body is placed in the second state as the second mode, and light from behind the mobile body enters the rear-view mirror and is reflected, when the rear-view mirror is viewed from above.

FIG. 11A illustrates display system 1 according to Variation 4 of Embodiment 1, and is a cross-sectional view illustrating an example of a state in which optical body 12 is placed in the first state as the first mode, and image light enters rear-view mirror 10a and is reflected, when rear-view mirror 10a is viewed from above. FIG. 11B illustrates display system 1 according to Variation 4 of Embodiment 1, and is a cross-sectional view illustrating an example of a state in which optical body 12 is placed in the second state as the second mode, and light from behind the mobile body enters rear-view mirror 10a and is reflected, when rear-view mirror 10a is viewed from above.

As illustrated in FIGS. 11A and 11B, this variation is different from Embodiment 1 in that a plane perpendicular to the normal at the center of concave mirror surface 12b1 and plane mirror surface 12c1 are not parallel to shaft center O of rotation shaft 12d. Other features in this variation are the same as those in Embodiment 1 unless otherwise specified, and the same numeral is given to the same feature so that a detailed description of the feature is omitted.

When viewed in the up-and-down direction and the lateral direction, optical body 12 has a quadrilateral shape. Specifically, normal direction H that is normal to plane mirror surface 12c1 of plane mirror 12c and normal direction H at the center of concave mirror surface 12b1 of concave mirror 12b are parallel. In the present embodiment, concave mirror 12b and plane mirror 12c are supported by support 12a in an orientation that causes normal direction H that is normal to plane mirror surface 12c1 and normal direction H at the center of concave mirror surface 12b1 to be parallel.

Plane mirror surface 12c1 of plane mirror 12c and the axis direction of rotation shaft 12d are not parallel. Also, the plane perpendicular to normal direction H at the center of concave mirror surface 12b1 and the axis direction of rotation shaft 12d are not parallel. Thus, the axis direction of rotation shaft 12d tilts relative to the plane perpendicular to normal direction H at the center of concave mirror surface 12b1 and plane mirror surface 12c1.

Thus, in display system 1 according to the present embodiment, plane mirror 12c faces in a direction opposite to a direction in which concave mirror 12b faces, and concave mirror 12b and plane mirror 12c are disposed such that: normal direction H at the center of concave mirror surface 12b1 and normal direction H that is normal to plane mirror surface 12c1 are parallel to each other; and plane mirror surface 12c1 of plane mirror 12c and an axis direction of rotation shaft 12d are not parallel to each other.

According to this, if normal direction H at the center of concave mirror 12b and normal direction H that is normal to plane mirror 12c are parallel, optical body 12 can be readily manufactured, and thus the cost for manufacturing optical body 12 is less likely to make a sharp rise. Normal direction H at the center of concave mirror 12b when the first mode is functioning and normal direction H that is normal to plane mirror 12c when the second mode is functioning can be readily prevented from being made parallel to each other, by merely avoiding plane mirror surface 12c1 of plane mirror 12c and the axial direction of rotation shaft 12d being parallel to each other. Thus, the amount of adjusting the position of display system 1 in the horizontal direction can be reduced.

This variation also yields equivalent operation effects to those described above.

Embodiment 2

<Configuration: Display System 1a>

Display system 1a according to the present embodiment is to be described.

Figure 12:
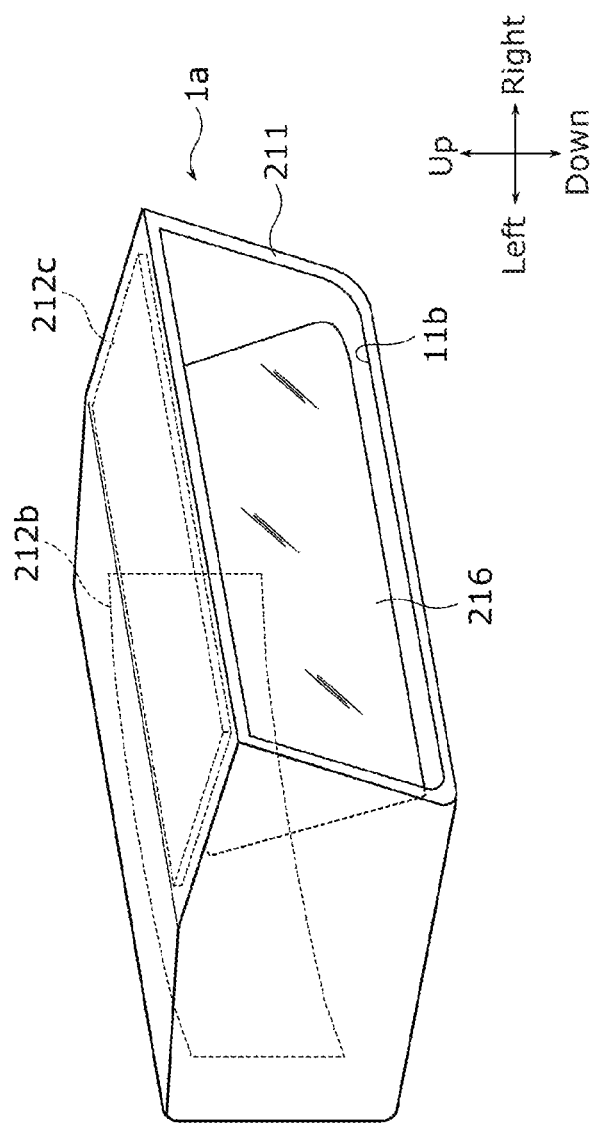
FIG. 12 is a perspective view illustrating an example of a display system according to Embodiment 2.
Figure 13:
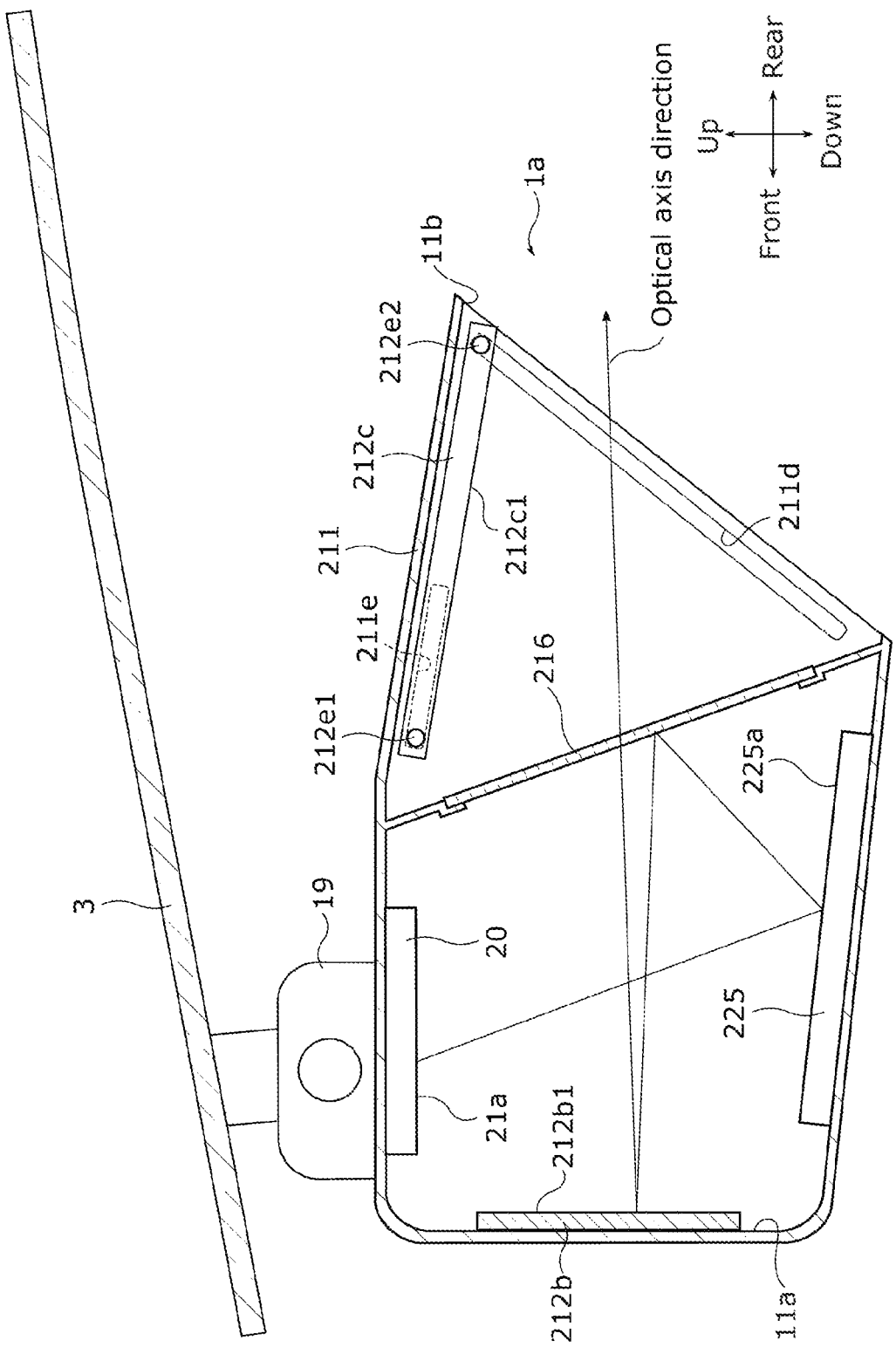
FIG. 13 is a cross-sectional view illustrating an example of a released state in which a plane mirror of the display system according to Embodiment 2 uncloses an opening.
Figure 14:
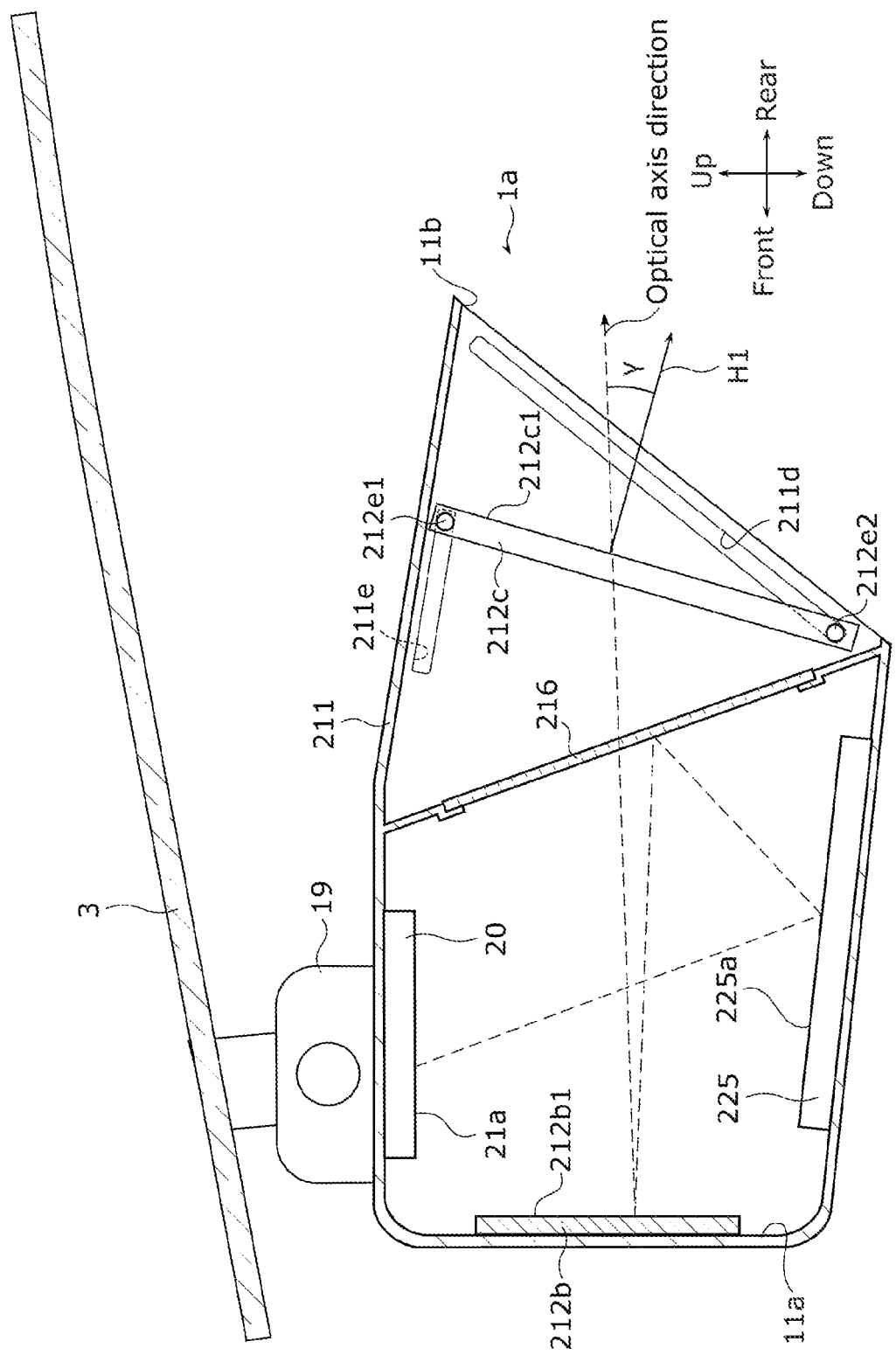
FIG. 14 is a cross-sectional view illustrating an example of a blocking state in which the plane mirror of the display system according to Embodiment 2 covers the opening.

FIG. 12 is a perspective view illustrating an example of display system 1a according to Embodiment 2. FIG. 13 is a cross-sectional view illustrating an example of a released state in which plane mirror 212c of display system 1a according to Embodiment 2 uncloses an opening. FIG. 14 is a cross-sectional view illustrating an example of a blocking state in which plane mirror 212c of display system 1a according to Embodiment 2 covers the opening.

As illustrated in FIGS. 12 to 14, the present embodiment is different from Embodiment 1 in that plane mirror 212c is switched between the released state and the blocking state. The features in this variation are the same as those in Embodiment 1 unless otherwise specified, and the same numeral is given to the same feature so that a detailed description of the feature is omitted. The released state of plane mirror 212c corresponds to the first mode, and the blocking state of plane mirror 212c corresponds to the second mode.

Display system 1a includes second casing 211, display device 20, middle reflecting member 225, concave mirror 212b, plane mirror 212c, and half mirror 216.

Second casing 211 is a storage formed of synthetic resin, for example. Second casing 211 has storage space 11a formed inside, and is formed into a rectangular parallelepiped elongated in the lateral direction and having an opening on a side facing the driver. Second casing 211 is formed such that the size in the lateral direction relative to the direction in which the mobile body moves is greater than each of the size in the up-and-down direction and the size in the front-and-rear direction. Second casing 211 stores display device 20, concave mirror 212b, plane mirror 212c, and half mirror 216.

Second casing 211 rotatably holds plane mirror 212c in storage space 11a while storing plane mirror 212c in storage space 11a. Specifically, side walls of second casing 211 on both sides in the lateral direction rotatably hold plane mirror 212c. Second casing 211 has a structure of holding plane mirror 212c in both the blocking and released states in which plane mirror 212c covers and uncloses opening 11b.

A plurality of guide grooves into which first protrusion 212e1 and second protrusion 212e2 of plane mirror 212c are inserted are formed in second casing 211. The guide grooves include first guide groove 211e into which first protrusion 212e1 of plane mirror 212c is inserted, and second guide groove 211d into which second protrusion 212e2 of plane mirror 212c is inserted. First guide groove 211e is formed in an internal surface of second casing 211 in the front-and-rear direction. Second guide groove 211d is formed in the internal surface of second casing 211 in the up-and-down direction. First protrusion 212e1 and second protrusion 212e2 change their positions (slide) in first guide groove 211e and second guide groove 211d, thus switching the state to one of the released state and the blocking state of plane mirror 212c.

Second casing 211 holds half mirror 216 between concave mirror 212b and plane mirror 212c. Specifically, second casing 211 holds half mirror 216 in a position in which half mirror 216 does not prevent rotation of plane mirror 212c in storage space 11a, while storing middle reflecting member 225 and half mirror 216 in storage space 11a. Half mirror 216 is later described in detail.

Display device 20 is fixed to an upper surface in second casing 211, overlaps middle reflecting member 225 when viewed from above, and is disposed between opening 11b of second casing 211 and concave mirror 212b. Thus, display device 20 is disposed above middle reflecting member 225, and is fixed to second casing 211, such that display surface 21a faces middle reflecting member 225. Display device 20 emits image light that forms an image displayed on display surface 21a. Image light emitted through display surface 21a of display device 20 falls onto and reflects off middle reflecting member 225, further falls onto and reflects off half mirror 216, further falls onto and reflects off concave mirror 212b, and thereafter passes through half mirror 216 and travels out of second casing 211, thus entering the driver's eye(s).

Middle reflecting member 225 is plane mirror 212c, for example, and is disposed on a lower part of second casing 211 with reflection surface 225a facing upward. Middle reflecting member 225 is disposed under display device 20, and reflects image light emitted by display device 20 toward half mirror 216.

Concave mirror 212b is a curved plate-shaped mirror stored and fixed in storage space 11a of second casing 211, with concave mirror surface 212b1 facing opening 11b of second casing 211. In the present embodiment, concave mirror 212b is disposed on the bottom of second casing 211.

Plane mirror 212c can be moved and is stored in second casing 211 when in the first mode. Accordingly, plane mirror 212c is a flat plate-shaped mirror stored in and fixed to second casing 211, covering opening 11b of second casing 211. When viewed in the up-and-down direction of the mobile body, plane mirror 212c is disposed between concave mirror 212b and a driver.

Plane mirror 212c is held in second casing 211 such that plane mirror 212c can place opening 11b of second casing 211 in the blocking state or the released state. The blocking state is a state in which image light from display device 20 is blocked from being emitted to the outside of second casing 211, and light that enters second casing 211 is reflected toward the driver's eye(s). In the blocking state, light from behind the mobile body is reflected by plane mirror 212c and enters the driver's eye(s), and thus the driver can see a rear-view image shown by the light.

The released state is a state in which image light is allowed to be emitted to the outside of second casing 211 (a state in which the blocking state is canceled), and image light from display device 20 is emitted to the outside of second casing 211. In the released state, image light output through display surface 21a of display device 20 is reflected by concave mirror 212b, and thereafter enters the driver's eye(s), and thus the driver can see a display image shown by the image light.

When display system 1a is viewed in the lateral direction, normal direction H1 that is normal to plane mirror surface 212c1 of plane mirror 212c when in the second mode in which plane mirror 212c is in the blocking state tilts by 10 degrees or more relative to the optical axis direction of light reflected by concave mirror 212b in the first mode in which plane mirror 212c is in the released state. Thus, as illustrated in FIG. 14, angle γ between normal direction H1 and the optical axis direction is 10 degrees or more. Accordingly, an object present behind the mobile body, such as, for example, ceiling 4 is prevented from appearing in plane mirror 212c.

Note that plane mirror 212c may be a liquid crystal panel. In this case, the liquid crystal panel is controlled by display controller 22, thus changing the transmittance of incident light. For example, plane mirror 212c may execute a reflection mode for reflecting light, and a transmission mode for transmitting image light. The light transmittance of plane mirror 212c changes according to an applied voltage. Specifically, plane mirror 212c can be placed in one of the states according to an applied voltage among the blocking state in which light is partially blocked, and the released state in which light blocking is canceled. The blocking state is a state in which the transmittance of visible light of a liquid crystal mirror is comparatively low, whereas the released state is a state in which the transmittance of visible light of a liquid crystal mirror is comparatively high. According to such a configuration, it is sufficient if plane mirror 212c is fixed in the position in FIG. 14, and thus it is unnecessary to rotatably hold plane mirror 212c. Accordingly, a structure for rotating plane mirror 212c is unnecessary.

Half mirror 216 is a flat plate-shaped member disposed between concave mirror 212b and plane mirror 212c in second casing 211. Specifically, half mirror 216 is disposed in and fixed to second casing 211 such that the internal surface faces concave mirror surface 12b1 of concave mirror 212b, and an external surface that is opposite the internal surface faces plane mirror 212c in the blocking state. Half mirror 216 is disposed obliquely relative to the up-and-down direction such that the lower edge of half mirror 216 protrude rearward than the upper edge. Note that in the present embodiment, the internal surface that is a reflection surface that reflects image light from display device 20 has a flat surface, but may have a curved surface like a free-form surface. Since the internal surface of half mirror 216 has a free-form surface, distortion of an image formed on the reflection surface can be reduced, field curvature can be reduced, and resolution can be improved.

Half mirror 216 has functions such as the light transmitting properties of transmitting a portion of light such as image light and light reflecting properties of reflecting another portion of the light. Half mirror 216 is a flat plate-shaped beam splitter whose light transmittance and reflectance are several tens of %.

Note that also in the present embodiment, plane mirror 212c may have the anti-glare function. In this case, lever 15a described in Embodiment 1 may be provided and operated, so that the tilt of second casing 211 is changed.

<Operation Effects>

Operation effects yielded by display system 1a according to the present embodiment are to be described.

Thus, in display system 1a according to the present embodiment, plane mirror 212c and concave mirror 212b are stored in second casing 211, and plane mirror 212c is disposed between concave mirror 212b and a driver of the mobile body when display system 1a is viewed in an up-and-down direction of the mobile body.

According to this, plane mirror 212c can be disposed closer to the driver, and concave mirror 212b can be disposed farther from the driver than plane mirror 212c. Accordingly, light can fall onto entire plane mirror surface 212c1 of plane mirror 212c, and thus a shadow of second casing 211 is less likely to be made on plane mirror surface 212c1.

Thus, in display system 1a according to the present embodiment, plane mirror 212c is fixed to second casing 211, and changes light transmittance.

According to this, the light transmittance of plane mirror 212c can be changed, and thus, for example, even if dazzling light from headlights of a mobile body behind, for instance, enters at night, the glare that the driver feels can be reduced.

Thus, in display system 1a according to the present embodiment, normal direction H1 that is normal to plane mirror 212c in the second mode tilts 10 degrees or more relative to an optical axis direction of light reflected by concave mirror 212b in the first mode.

According to this, the normal direction that is normal to plane mirror 212c can be tilted for 10 degrees or more relative to the optical axis direction of light reflected by concave mirror 212b. Accordingly, an object (a rear-view image) present behind the mobile body can be prevented from appearing in plane mirror 212c.

Thus, in display system 1a according to the present embodiment, plane mirror 212c is movable, and is stored in second casing 211 in the first mode.

According to this, plane mirror 212c can be moved, and thus the second mode and the first mode can be readily switched.

Variation of Embodiment 2

Display system 1b according to the present embodiment is to be described.

Figure 15:
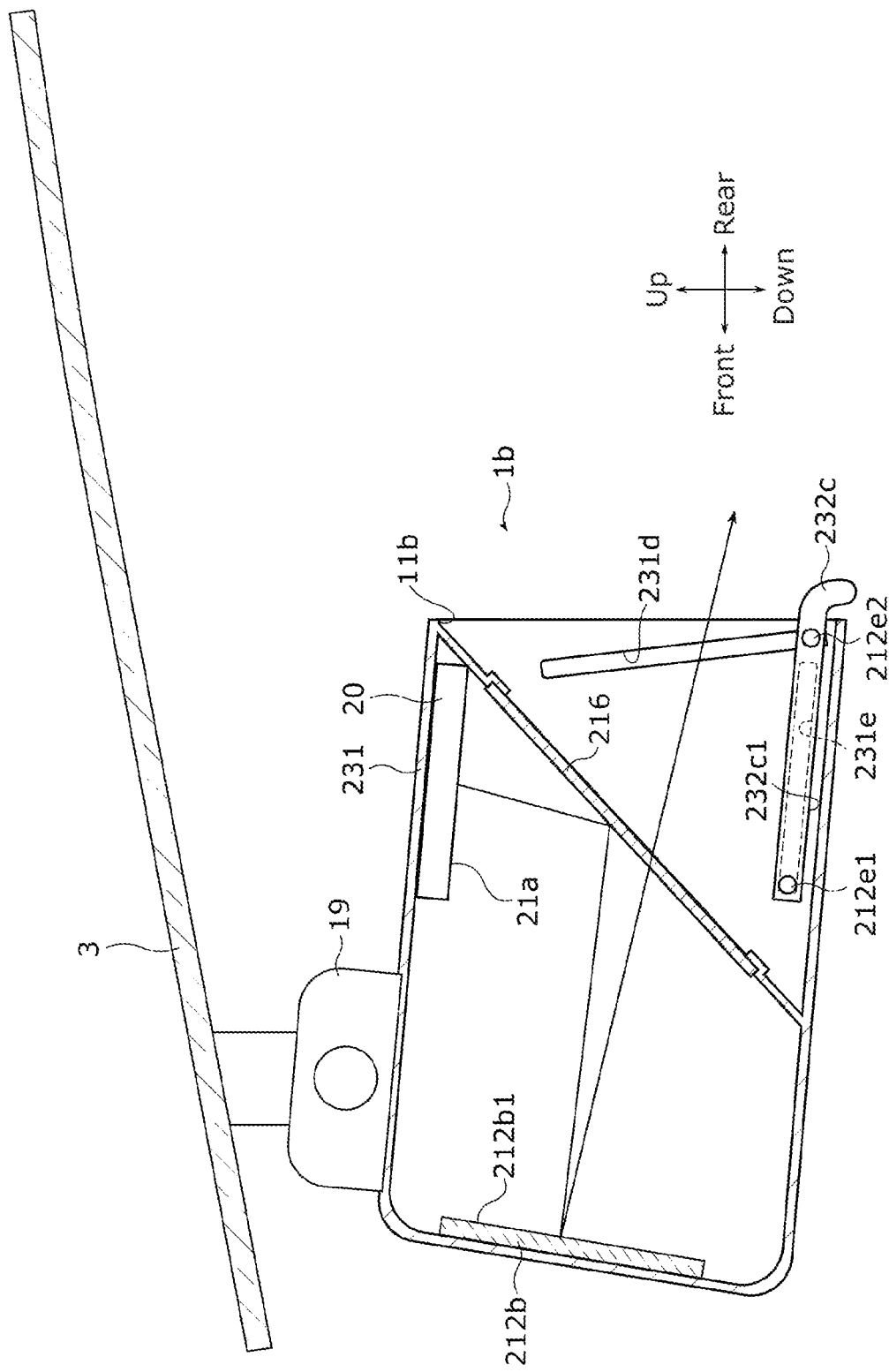
FIG. 15 is a cross-sectional view illustrating an example of a state in which a plane mirror of a display system according to a variation of Embodiment 2 is in the released state.
Figure 16:
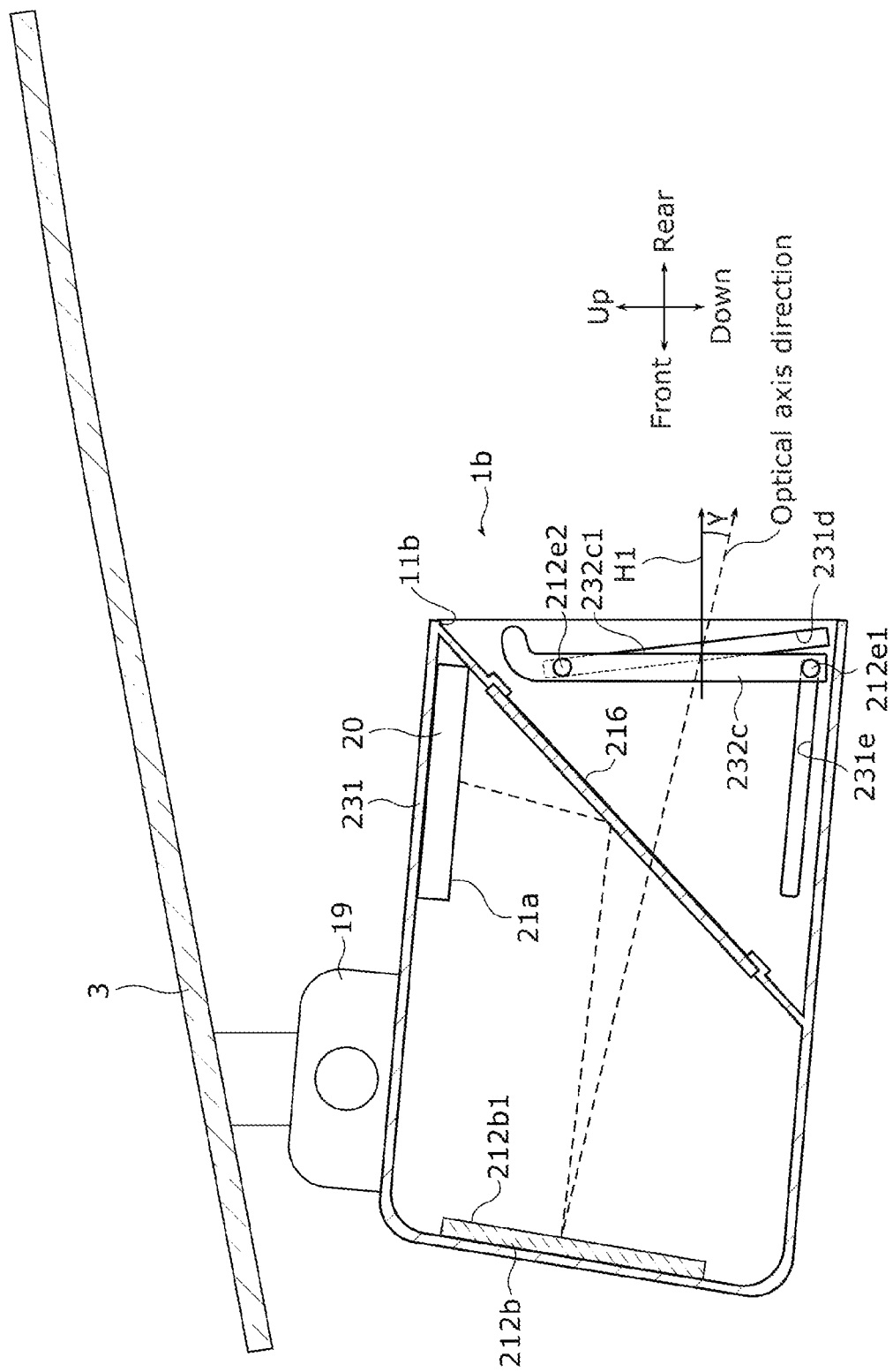
FIG. 16 is a cross-sectional view illustrating an example of a state in which the plane mirror of the display system according to the variation of Embodiment 2 is in the blocking state.

FIG. 15 is a cross-sectional view illustrating an example of a state in which plane mirror 232c of display system 1b according to a variation of Embodiment 2 is in the released state. FIG. 16 is a cross-sectional view illustrating an example of a state in which plane mirror 232c of display system 1b according to the variation of Embodiment 2 is in the blocking state.

As illustrated in FIGS. 15 and 16, this variation is different from Embodiment 2 in that plane mirror 232c is disposed under second casing 231 in the released state. This variation is different from Embodiment 2 also in that a middle reflecting member is not provided in second casing 231. Other features in this variation are the same as those in, for instance, Embodiment 2 unless otherwise specified, and the same numeral is given to the same feature so that a detailed description of the feature is omitted.

A plurality of guide grooves into which first protrusion 212e1 and second protrusion 212e2 of plane mirror 212c are inserted are formed in second casing 211. The guide grooves include first guide groove 211e into which first protrusion 212e1 of plane mirror 212c is inserted, and second guide groove 211d into which second protrusion 212e2 of plane mirror 212c is inserted.

The guide grooves include first guide groove 231e into which first protrusion 212e1 of plane mirror 232c is inserted, and second guide groove 231d into which second protrusion 212e2 of plane mirror 232c is inserted. The positions of first protrusion 212e1 and second protrusion 212e2 change in first guide groove 231e and second guide groove 231d, so that the state of plane mirror 212c is switched to one of the released state and the blocking state.

Plane mirror 232c can be moved, and is stored in second casing 231 when in the first mode. Accordingly, plane mirror 232c is a flat plate-shaped mirror stored in and fixed to second casing 231, covering opening 11b of second casing 231. Plane mirror 232c is held in second casing 231 such that plane mirror 232c can place opening 11b of second casing 231 in the blocking state or the released state.

Display device 20 is fixed to the upper surface in second casing 231, overlaps half mirror 216 when viewed from above, and is disposed between opening 11b of second casing 231 and concave mirror 212b. Stated differently, display device 20 is disposed above half mirror 216, and is fixed to second casing 231, such that display surface 21a faces half mirror 216.

Image light emitted through display surface 21a of display device 20 falls onto and reflects off half mirror 216, further falls onto and reflects off concave mirror 212b, and thereafter passes through half mirror 216 and travels out of second casing 231, thus entering the driver's eye(s).

Half mirror 216 in this variation is disposed such that the normal direction that is normal to the internal surface (a surface that faces concave mirror 212b) obliquely crosses the incidence direction of image light from display surface 21a of display device 20 and the incidence direction of image light from concave mirror surface 212b1. Half mirror 216 is disposed obliquely relative to the up-and-down direction such that the lower edge of half mirror 216 protrudes forward than the upper edge relative to a plane perpendicular to the normal direction at the center of concave mirror surface 212b1 of concave mirror 212b.

This variation also yields equivalent operation effects to those described above.

Embodiment 3

<Configuration: Display System 1c>

Display system 1c according to the present embodiment is to be described.

Figure 17:
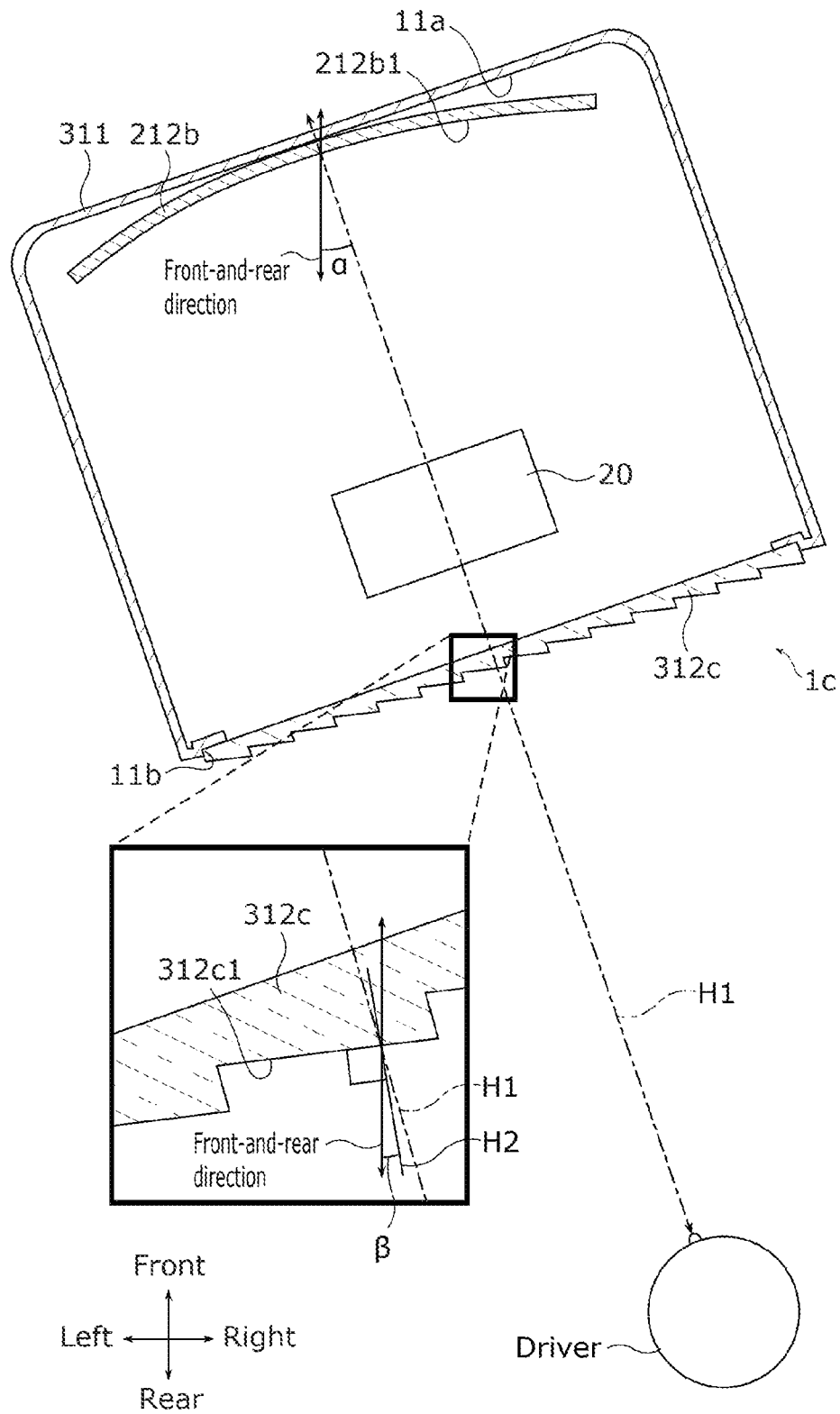
FIG. 17 illustrates a display system according to Embodiment 3, and is a cross-sectional view illustrating an example of a case where a rear-view mirror is viewed from above when a plane mirror is placed in the blocking state.

FIG. 17 illustrates display system 1c according to Embodiment 3, and is a cross-sectional view illustrating an example of a case where rear-view mirror 10 is viewed from above when plane mirror 312c is placed in the blocking state.

As illustrated in FIG. 17, in the present embodiment, plane mirror 312c includes Fresnel reflection surface 312c1. This point is different from Embodiment 2. Other features in the present embodiment are the same as those in Embodiment 2 and the variation thereof unless otherwise specified, and the same numeral is given to the same feature so that a detailed description of the feature is omitted.

Plane mirror 312c that is fixed includes Fresnel reflection surface 312c1. Thus, the plane mirror surface is constituted by one or more Fresnel reflection surfaces 312c1. Fresnel reflection surface 312c1 of the present embodiment includes a plurality of sawtooth grooves extending in the up-and-down direction when plane mirror 312c is viewed in the up-and-down direction. Fresnel reflection surface 312c1 is a band-shaped flat surface elongated in the up-and-down direction and formed in plane mirror 312c.

Angle α between the front-and-rear direction and normal direction H1 at the center of concave mirror surface 212b1 is greater than angle β between the front-and-rear direction and normal direction H2 that is normal to Fresnel reflection surface 312c1. In particular, angle α between the front-and-rear direction and normal direction H1 at the center of concave mirror surface 212b1 is preferably twice the angle between normal direction H2 that is normal to Fresnel reflection surface 312c1 and the front-and-rear direction.

<Operation Effect>

The operation effects yielded by display system 1c according to the present embodiment are to be described.

Thus, in display system 1c according to the present embodiment, plane mirror 312c includes Fresnel reflection surface 312c1.

According to this, plane mirror 312c can control distribution of incident light from behind the mobile body and reflect the light. Accordingly, an increase in the size of display system 1c can be reduced as compared with a configuration in which a line passing through the center of the plane mirror surface that is a single plane and extending in a defined direction along the plane mirror surface and a tangent at the center of the concave mirror surface, which is extending in a defined direction of the concave mirror surface, are not parallel to each other.

The present embodiment also yields operation effects equivalent to those described above.

Note that display system 1 according to Embodiment 1 may also have the configuration in which plane mirror 12c includes a Fresnel reflection surface. Also in this case, operation effects equivalent to those described above are yielded.

Variation of Embodiment 3

<Configuration: Display System 1d>

Display system 1d according to this variation is to be described.

Figure 18:
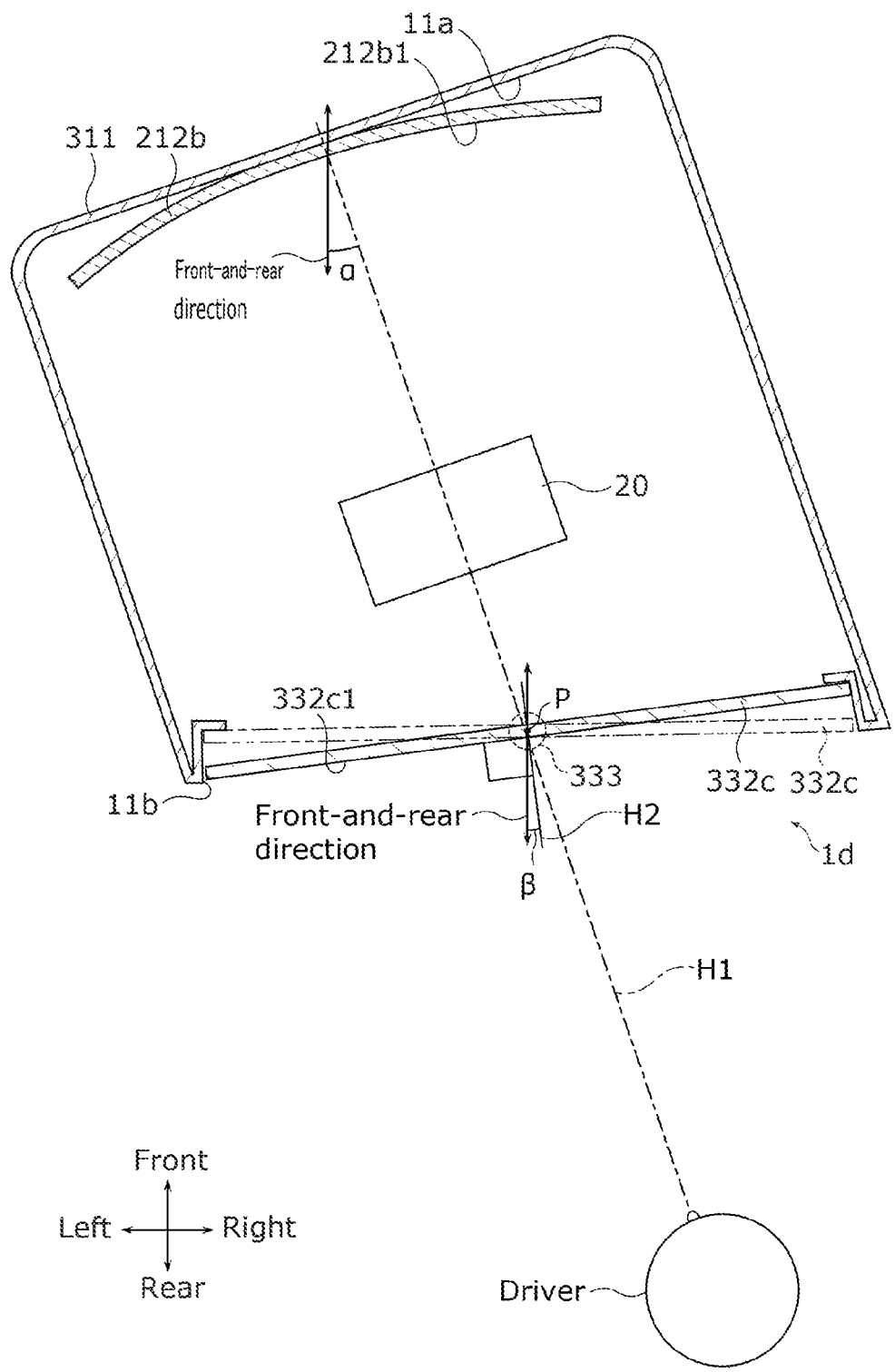
FIG. 18 illustrates a display system according to a variation of Embodiment 3, and is a cross-sectional view illustrating an example of a case where the rear-view mirror is viewed from above when a plane mirror is placed in the blocking state.

FIG. 18 illustrates display system 1d according to a variation of Embodiment 3, and is a cross-sectional view illustrating an example of a case where rear-view mirror 10 is viewed from above when plane mirror 332c is placed in the blocking state.

As illustrated in FIG. 18, in this variation, plane mirror 312c in Embodiment 3 does not include Fresnel reflection surface 312c1, and the orientation of plane mirror 332c can be adjusted instead, which differs from Embodiment 3. Other features in this variation are the same as those in Embodiment 3 unless otherwise specified, and the same numeral is given to the same feature so that a detailed description of the feature is omitted.

Plane mirror 332c that turns includes orientation adjuster 333 that adjusts the orientation relative to concave mirror 212b. Plane mirror 332c is attached via orientation adjuster 333 provided on a frame (not illustrated). The frame includes first protrusion 212e1 and second protrusion 212e2, which are inserted into first guide groove 211e and second guide groove 211d, respectively. Orientation adjuster 333 includes, for example, a rotation shaft and a hinge swingable on shaft center P in the direction substantially parallel to the up-and-down direction, which are provided on second casing 311. Accordingly, orientation adjuster 333 can turn plane mirror 332c so as to change an angle between normal direction H1 at the center of concave mirror surface 212b1 and normal direction H2 that is normal to plane mirror surface 332c1. Specifically, orientation adjuster 333 turns concave mirror surface 212b1 in a range in which angle β formed between normal direction H2 normal to plane mirror surface 332c1 and the front-and-rear direction is smaller than angle α formed between normal direction H1 at the center of concave mirror surface 212b1 and the front-and-rear direction.

<Operation Effect>

The operation effects yielded by display system 1d according to the present embodiment are to be described.

In display system 1d according to the present embodiment, plane mirror 332c includes orientation adjuster 333 that adjusts an orientation relative to concave mirror surface 212b1.

According to this, the orientation of plane mirror 332c relative to concave mirror 212b can be adjusted discretionarily, and thus when the second mode and the first mode are switched, the flexibility of adjustment of display system 1d can be increased.

This variation also yields equivalent operation effects to those described above.

Other Variations Etc

The above has described the present disclosure, based on Embodiments 1 to 3, Variations 1 to 4 of Embodiment 1 and the variations of Embodiments 2 and 3, yet the present disclosure is not limited to Embodiments 1 to 3, Variations 1 to 4 of Embodiment 1, and the variations of Embodiments 2 and 3, for instance.

Figure 19:
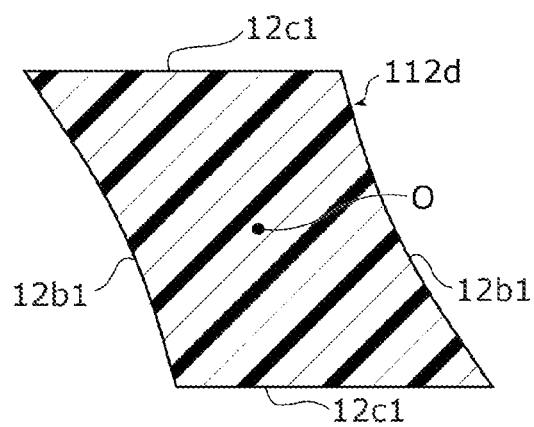
FIG. 19 is a cross-sectional view illustrating an example of an optical body of a display system according to another variation.

For example, in the display systems according to Embodiments 1 to 3, Variations 1 to 4 of Embodiment 1, and the variations of Embodiments 2 and 3, optical body 112d may have a lozenge shape when optical body 112d is viewed in the lateral direction, as illustrated in FIG. 19. FIG. 19 is a cross-sectional view illustrating an example of optical body 112d of the display system according to another variation. A pair of concave mirror surfaces 12b1 and a pair of plane mirror surfaces 12c1 may be formed on opposite sides out of the four sides of optical body 12. Accordingly, the angle of rotation can be reduced when concave mirror surface 12b1 and plane mirror surface 12c1 are switched. Note that one or more concave mirror surfaces 12b1 and one or more plane mirror surfaces 12c1 may be formed on three sides out of the four sides of optical body 112d. The shape of optical body 112d is not limited to the lozenge shape, and may be a polygonal shape such as a trapezoidal shape.

The processing elements included in the display systems according to Embodiments 1 to 3, Variations 1 to 4 of Embodiment 1, and the variations of Embodiments 2 and 3 are typically achieved as large-scale integrated circuits (LSIs). The integrated circuits may be each formed into a single chip or some or all of the integrated circuits may be formed into a single chip.

Furthermore, the way to achieve integration is not limited to large-scale integration, and implementation through a dedicated circuit or a general-purpose processor is also possible. A field programmable gate array (FPGA) that can be programmed after manufacturing an LSI or a reconfigurable processor that allows re-configuration of the connection and configuration of circuit cells inside an LSI can be used.

Note that each of the elements in the display systems according to Embodiments 1 to 3, Variations 1 to 4 of Embodiment 1, and the variations of Embodiments 2 and 3 may be configured in the form of an exclusive hardware product, or may be achieved by executing a software program suitable for the element. Each of the elements may be achieved by a program executor such as a CPU or a processor reading and executing the software program recorded on a recording medium such as a hard disc or a semiconductor memory.

All the numerals used above are stated as examples to specifically describe the present disclosure, and thus Embodiments 1 to 3, Variations 1 to 4 of Embodiment 1, and the variations of Embodiments 2 and 3 of the present disclosure are not limited to the numerals stated as examples.

Split of functional blocks in a block diagram is an example, and thus a plurality of functional blocks may be achieved as one functional block, one functional block may be split into a plurality of blocks, or some functions may be transferred to another functional block. Single hardware or software may process similar functions of a plurality of functional blocks, in parallel or by time division.

The order in which steps included in the flowchart are performed is an example for specifically describing the present disclosure, and the order other than the above may be applied. Further, some of the steps may be performed simultaneously (in parallel) with other steps.

The present disclosure also includes embodiments as a result of adding, to Embodiments 1 to 3, Variations 1 to 4 of Embodiment 1, and the variations of Embodiments 2 and 3, various modifications that may be conceived by those skilled in the art, and embodiments achieved by combining elements and functions in Embodiments 1 to 3, Variations 1 to 4 of Embodiment 1, and the variations of Embodiments 2 and 3 in any manner without departing from the scope of the present disclosure.

While various embodiments have been described herein above, it is to be appreciated that various changes in form and detail may be made without departing from the spirit and scope of the present disclosure as presently or hereafter claimed.

Further Information about Technical Background to this Application

The disclosures of the following Japanese Patent Applications including specification, drawings and claims are incorporated herein by reference in their entirety: Japanese Patent Application No. 2020-028682 filed on Feb. 21, 2020 and Japanese Patent Application No. 2020-153546 filed on Sep. 14, 2020.

INDUSTRIAL APPLICABILITY

The present disclosure is applicable to vehicles, for example.

The invention claimed is:

1. A display system comprising:
a display provided in a mobile body;
a concave mirror for displaying, in a first mode, a virtual image of a display image shown by image light emitted by the display; and
a plane mirror for reflecting, in a second mode, a rear-view image shown by light that has entered the mobile body,
wherein
in a top view of the mobile body, the display and the concave mirror are disposed such that a straight line that connects a center of the display and a center of the concave mirror has a predetermined angle relative to a front-and-rear direction of the mobile body,
a normal direction at a center of a concave mirror surface of the concave mirror when the first mode is functioning and a normal direction that is normal to a plane mirror surface of the plane mirror when the second mode is functioning are not parallel to each other, and
in the top view of the mobile body, the predetermined angle ranges from a lower limit angle to an upper limit angle, the lower limit angle being (i) obtained based on a distance between eyes of a person in the mobile body who sees the concave mirror, and a length of a straight line that connects a middle point between the eyes and the center of the concave mirror, and (ii) formed between the straight line and a straight line that connects one of the eyes and the center of the concave mirror, the upper limit angle being formed between a straight line extending in a lateral direction relative to a direction in which the mobile body moves and passing through the center of the concave mirror and a straight line extending in the front-and-rear direction of the mobile body and passing through the center of the concave mirror.

2. The display system according to claim 1,
wherein a line passing through the center of the display and extending along the display and a tangent at the center of the concave mirror are parallel to each other.

3. The display system according to claim 1,
wherein the display is disposed closer to a driver of the mobile body than to a straight line that is parallel to the front-and-rear direction of the mobile body and passes through the center of the concave mirror.

4. The display system according to claim 1,
wherein the plane mirror includes an orientation adjuster that adjusts an orientation relative to the concave mirror surface.

5. A display system comprising:
a display provided in a mobile body;
a concave mirror for displaying, in a first mode, a virtual image of a display image shown by image light emitted by the display; and
a plane mirror for reflecting, in a second mode, a rear-view image shown by light that has entered the mobile body,
wherein
in a top view of the mobile body, the display and the concave mirror are disposed such that a straight line that connects a center of the display and a center of the concave mirror has a predetermined angle relative to a front-and-rear direction of the mobile body,
a normal direction at a center of a concave mirror surface of the concave mirror when the first mode is functioning and a normal direction that is normal to a plane mirror surface of the plane mirror when the second mode is functioning are not parallel to each other,
the concave mirror and the plane mirror are stored in a first casing, and
the first casing includes a rotation shaft for rotating the concave mirror and the plane mirror inside of the first casing.

6. The display system according to claim 5, further comprising:
an optical body that includes the concave mirror and the plane mirror,
wherein the plane mirror is opposed to the concave mirror such that the plane mirror surface faces outward, and
the optical body has a wedge shape when the optical body is viewed in an up-and-down direction of the mobile body.

7. The display system according to claim 6,
wherein a distance between the plane mirror and the concave mirror at an end portion of the optical body closer to a driver of the mobile body in a lateral direction is shorter than a distance between the plane mirror and the concave mirror at an end portion of the optical body farther from the driver in the lateral direction, the lateral direction being a direction relative to a direction in which the mobile body moves.

8. The display system according to claim 5,
wherein the plane mirror faces in a direction opposite to a direction in which the concave mirror faces, and
the concave mirror and the plane mirror are disposed such that:
the normal direction at the center of the concave mirror surface and the normal direction that is normal to the plane mirror surface are parallel to each other; and
the plane mirror surface of the plane mirror and an axis direction of the rotation shaft are not parallel to each other.

9. The display system according to claim 5, further comprising:
an optical body that includes the concave mirror and the plane mirror,
wherein the plane mirror faces in a direction opposite to a direction in which the concave mirror faces, and
the optical body has a wedge shape when the optical body is viewed in a lateral direction relative to a direction in which the mobile body moves.

10. A display system comprising:
a display provided in a mobile body;
a concave mirror for displaying, in a first mode, a virtual image of a display image shown by image light emitted by the display; and
a plane mirror for reflecting, in a second mode, a rear-view image shown by light that has entered the mobile body,
wherein
in a top view of the mobile body, the display and the concave mirror are disposed such that a straight line that connects a center of the display and a center of the concave mirror has a predetermined angle relative to a front-and-rear direction of the mobile body,
a normal direction at a center of a concave mirror surface of the concave mirror when the first mode is functioning and a normal direction that is normal to a plane mirror surface of the plane mirror when the second mode is functioning are not parallel to each other,
the plane mirror and the concave mirror are stored in a second casing, and
the plane mirror is disposed between the concave mirror and a driver of the mobile body when the display system is viewed in an up-and-down direction of the mobile body.

11. The display system according to claim 10,
wherein the plane mirror is fixed to the second casing, and changes light transmittance.

12. The display system according to claim 11,
wherein the normal direction that is normal to the plane mirror surface in the second mode tilts 10 degrees or more relative to an optical axis direction of light reflected by the concave mirror in the first mode.

13. The display system according to claim 10,
wherein the plane mirror is movable, and is stored in the second casing in the first mode.

14. The display system according to claim 10,
wherein the plane mirror includes a Fresnel reflection surface.

* * * * *